(12) United States Patent
Jeon et al.

(10) Patent No.: US 12,555,576 B2
(45) Date of Patent: Feb. 17, 2026

(54) ARTIFICIAL INTELLIGENCE APPARATUS AND METHOD FOR CONTROLLING THE SAME

(71) Applicant: LG ELECTRONICS INC., Seoul (KR)

(72) Inventors: Yuyong Jeon, Seoul (KR); Heewan Park, Seoul (KR); Donghoon Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 442 days.

(21) Appl. No.: 18/052,745

(22) Filed: Nov. 4, 2022

(65) Prior Publication Data

US 2023/0136611 A1 May 4, 2023

(30) Foreign Application Priority Data

Nov. 4, 2021 (WO) ................ PCT/KR2021/015937

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
CPC .... G10L 15/22; G10L 15/30; G10L 2015/223
See application file for complete search history.

(56) References Cited

U.S. PATENT DOCUMENTS

| 12,190,877 | B1* | 1/2025 | Barber | .................... G10L 15/22 |
| 2016/0155443 | A1* | 6/2016 | Khan | ..................... G06F 3/167 |
| | | | | 704/275 |

(Continued)

FOREIGN PATENT DOCUMENTS

| KR | 1020190093528 | 8/2019 |
| KR | 1020190094307 | 8/2019 |

(Continued)

OTHER PUBLICATIONS

PCT International Application No. PCT/KR2021/015937, Written Opinion and International Search Report dated Jul. 20, 2022, 11 pages.

*Primary Examiner* — Bhavesh M Mehta
*Assistant Examiner* — Eunice Lee
(74) *Attorney, Agent, or Firm* — LEE, HONG, DEGERMAN, KANG & WAIMEY

(57) ABSTRACT

A method of controlling an artificial intelligence device may include receiving an operation command at a plurality of artificial intelligence devices; determining a first artificial intelligence device closest to a point-of-origin of an operation command based on the operation command being received at the plurality of artificial intelligence devices; outputting a response corresponding to the operation command through the first artificial intelligence device; determining a second artificial intelligence device that will perform an operation corresponding to the operation command, and transmitting a control command corresponding to the operation command to the second artificial intelligence device; and performing, by the second artificial intelligence device, an operation corresponding to the operation command based on the control command.

16 Claims, 24 Drawing Sheets

(56) References Cited

U.S. PATENT DOCUMENTS

| | | | | |
|---|---|---|---|---|
| 2017/0076720 | A1* | 3/2017 | Gopalan | G10L 15/22 |
| 2018/0012462 | A1* | 1/2018 | Heitz, III | G06V 40/20 |
| 2018/0286400 | A1 | 10/2018 | Seo et al. | |
| 2018/0359364 | A1* | 12/2018 | Gunther | H04M 3/5191 |
| 2019/0311720 | A1* | 10/2019 | Pasko | G06F 3/167 |

FOREIGN PATENT DOCUMENTS

| | | |
|---|---|---|
| KR | 1020190096308 | 8/2019 |
| KR | 1020210045280 | 4/2021 |

\* cited by examiner

|  | DISTANCE BETWEEN AI HUB DEVICE AND FIRST EXTERNAL ARTIFICIAL INTELLIGENCE | DISTANCE BETWEEN AI HUB DEVICE AND SECOND EXTERNAL ARTIFICIAL INTELLIGENCE DEVICE |
|---|---|---|
|  | 3m | 5m |
| PRIORITY | 1 | 2 |

ARTIFICIAL INTELLIGENCE APPARATUS AND METHOD FOR CONTROLLING THE SAME

CROSS-REFERENCE TO RELATED APPLICATIONS

Pursuant to 35 U.S.C. § 119(a), this application claims the benefit of an earlier filing date of and the right of priority to International Application No. PCT/KR2021/015937, filed Nov. 4, 2021, the contents of which are hereby incorporated by reference herein in its entirety.

TECHNICAL FIELD

The present disclosure relates to an artificial intelligence device and, more particularly, to an artificial intelligence device that can select a device capable of performing an operation in response to a speech command of a user.

BACKGROUND

Competition for speech recognition technology that has started in smartphones is now expected to be intensified in the home with the full-scale proliferation of the Internet of things (IoT).

In particular, it is noteworthy that the device is an artificial intelligence (AI) device capable of issuing a command and having a conversation through speech.

A speech recognition service has a structure that selects an optimal answer to a user's question using a vast amount of database.

A speech retrieval function refers to a method of converting input speech data into text in a cloud server, analyzing the text, and retransmitting a real-time retrieval result to a device according to the analysis result.

The cloud server has a computing capability capable of dividing a large number of words into speech data according to gender, age and intonation, and storing and processing the speech data in real time.

As more speech data is accumulated, speech recognition will be accurate to the level of human parity.

In recent years, a plurality of artificial intelligence devices capable of performing speech recognition are present in the home.

In order for the user to select an artificial intelligence device to be controlled, an utterance command is analyzed to determine a device according to the analysis result.

However, when a plurality of artificial intelligence devices are in the home and a command uttered by the user does not specify a device, it is unclear which device must be operated.

SUMMARY

An aspect of the present disclosure is to solve the foregoing and other problems.

Another aspect of the present disclosure is to provide an artificial intelligence device capable of selecting a device to be controlled from among a plurality of artificial intelligence devices using the speech quality and intention of an operation command uttered by a user.

Still another aspect of the present disclosure is to provide an artificial intelligence device capable of selecting a device to be controlled from among a plurality of artificial intelligence devices according to the voice volume and intention of an operation command uttered by the user.

Yet still another aspect of the present disclosure is to provide an artificial intelligence device capable of performing a response and an operation to an operation command uttered by the user in an optimized method for a plurality of artificial intelligence devices, and a method thereof.

There is disclosed a method of controlling an artificial intelligence device according to an embodiment of the present disclosure, and the method may include receiving an operation command at a plurality of artificial intelligence devices; determining a first artificial intelligence device closest to a point-of-origin of an operation command based on the operation command being received at the plurality of artificial intelligence devices; outputting a response corresponding to the operation command through the first artificial intelligence device; determining a second artificial intelligence device that will perform an operation corresponding to the operation command, and transmitting a control command corresponding to the operation command to the second artificial intelligence device; and performing, by the second artificial intelligence device, an operation corresponding to the operation command based on the control command.

In an embodiment, when an operation command is received from the plurality of artificial intelligence devices, the determining of a first artificial intelligence device may determine the first artificial intelligence device closest to a point-of-origin of the operation command based on a volume level of the received operation command.

In an embodiment, the plurality of artificial intelligence devices may include sensors capable of sensing a distance to the point-of-origin of the operation command, wherein the determining of a first artificial intelligence device determines the first artificial intelligence device closest to the point-of-origin of the operation command based on the sensor.

In an embodiment, the outputting of a response corresponding to the operation command through the first artificial intelligence device may output the response corresponding to the operation command even when the operation corresponding to the operation command is an operation for a second artificial intelligence device other than the first artificial intelligence device.

In an embodiment, the transmitting of a control command corresponding to the operation command to the second artificial intelligence device may include determining, by a first artificial intelligence device closest to a point-of-origin of the operation command, whether an artificial intelligence device capable of performing an operation corresponding to the operation command is present; determining the artificial intelligence device capable of an operation corresponding to the operation command as a second artificial intelligence device; and transmitting, by the first artificial intelligence device, a control command corresponding to the operation command to the second artificial intelligence device.

In an embodiment, the transmitting of a control command corresponding to the operation command to the second artificial intelligence device may include receiving an operation command at the plurality of artificial intelligence devices; determining, by the plurality of artificial intelligence devices, respectively, artificial intelligence devices that will perform an operation corresponding to the operation command; and determining the second artificial intelligence device based on a preset algorithm when the artificial intelligence devices that will perform the operation corresponding to the operation command determined by the plurality of artificial intelligence devices are different from one another.

In an embodiment, the preset algorithm may determine the second artificial intelligence device based on at least one of a majority vote and a result determined by the nearest artificial intelligence device.

In an embodiment, the transmitting of a control command corresponding to the operation command to the second artificial intelligence device may include determining whether there are a plurality of second artificial intelligence devices capable of performing an operation corresponding to the operation command; and selecting any one second artificial intelligence device through at least one of a distance to a point-of-origin of the operation command, an execution history of the relevant operation command, a priority, and the reception of an additional command when there are the plurality of second artificial devices.

In an embodiment, the performing, by the second artificial intelligence device, of an operation corresponding to the operation command based on the control command may output a notification sound to notify an utterer of whether the control command has been received when the second artificial intelligence device receives the control command.

An artificial intelligence device according to an embodiment of the present disclosure may include a microphone that receives a command uttered by a user; a wireless communication unit that performs communication with an external artificial intelligence device;

an audio output module that outputs a response corresponding to the command; and a processor that determines a first artificial intelligence device closest to a point-of-origin of an operation command based on the operation command being received at a plurality of artificial intelligence, wherein in the case of the first artificial intelligence device, the processor outputs a response corresponding to the operation command through the first artificial intelligence device, determines a second artificial intelligence device that will perform an operation corresponding to the operation command, and transmits a control command corresponding to the operation command to the second artificial intelligence device.

In an embodiment, in the case of the second artificial intelligence device, the processor may perform an operation corresponding to the operation command based on the control command.

In an embodiment, when an operation command is received from the plurality of artificial intelligence devices, the processor may determine a first artificial intelligence device closest to a point-of-origin of the operation command based on a volume level of the received operation command.

In an embodiment, the artificial intelligence device may further include a sensor capable of sensing a distance to a point-of-origin of an operation command, wherein the processor determines a first artificial intelligence device closest to the point-of-origin of the operation command based on the sensor.

In an embodiment, even when the operation corresponding to the operation command is an operation for a second artificial intelligence device rather than the first artificial intelligence device, a response corresponding to the operation command may be output through the first artificial intelligence device.

In an embodiment, the processor may determine, by a first artificial intelligence device closest to a point-of origin of the operation command, whether an artificial intelligence device capable of performing an operation corresponding to the operation command is present, determine the artificial intelligence device capable of performing an operation corresponding to the operation command as a second artificial intelligence device, and transmit, by the first artificial intelligence device, a control command corresponding to the operation command to the second artificial intelligence device.

In an embodiment, the processor may receive an operation command at the plurality of artificial intelligence devices, determine, by the plurality of artificial intelligence devices, respectively, artificial intelligence devices that will perform an operation corresponding to the operation command, and determine the second artificial intelligence device based on a preset algorithm when the artificial intelligence devices that will perform the operation corresponding to the operation command determined by the plurality of artificial intelligence devices are different from one another.

In an embodiment, the preset algorithm may determine the second artificial intelligence device based on at least one of a majority vote and a result determined by the nearest artificial intelligence device.

In an embodiment, the processor may determine whether there are a plurality of second artificial intelligence devices capable of performing an operation corresponding to the operation command, and select any one second artificial intelligence device through at least one of a distance to a point-of-origin of the operation command, an execution history of the relevant operation command, a priority, and the reception of an additional command when there are the plurality of second artificial devices.

In an embodiment, in the case of the second artificial intelligence device, upon receiving the control command, the processor may output a notification sound to notify an utterer of whether the control command has been received.

According to an embodiment of the present disclosure, a device to be controlled may be selected according to the speech quality of a command, thereby allowing a user to more easily select the device to be controlled.

According to the embodiment of the present disclosure, a device to be controlled may be selected according to the volume of a command, thereby allowing the user to select the device to be controlled, without any undesired confusion, by changing only the volume of his or her voice.

According to an embodiment of the present disclosure, the voice volume and intention of the user's speech command may be recognized to clearly select a device that will perform an operation corresponding to the speech command. Accordingly, the user may obtain a desired result by simply uttering a speech command that changes the volume of an utterance.

Furthermore, the user may accurately obtain a desired result by uttering only a command to perform his or her desired operation without uttering the name of a device, thereby feeling an improved user experience.

In addition, in the present disclosure, even when a device desired to be controlled is far from an utterer, a control command may be transmitted to the device to be controlled through a nearby artificial intelligence device, and a response may be heard through the nearby artificial intelligence device, thereby reducing a moving line for applying the control command.

DETAILED DESCRIPTION

Figure 1:
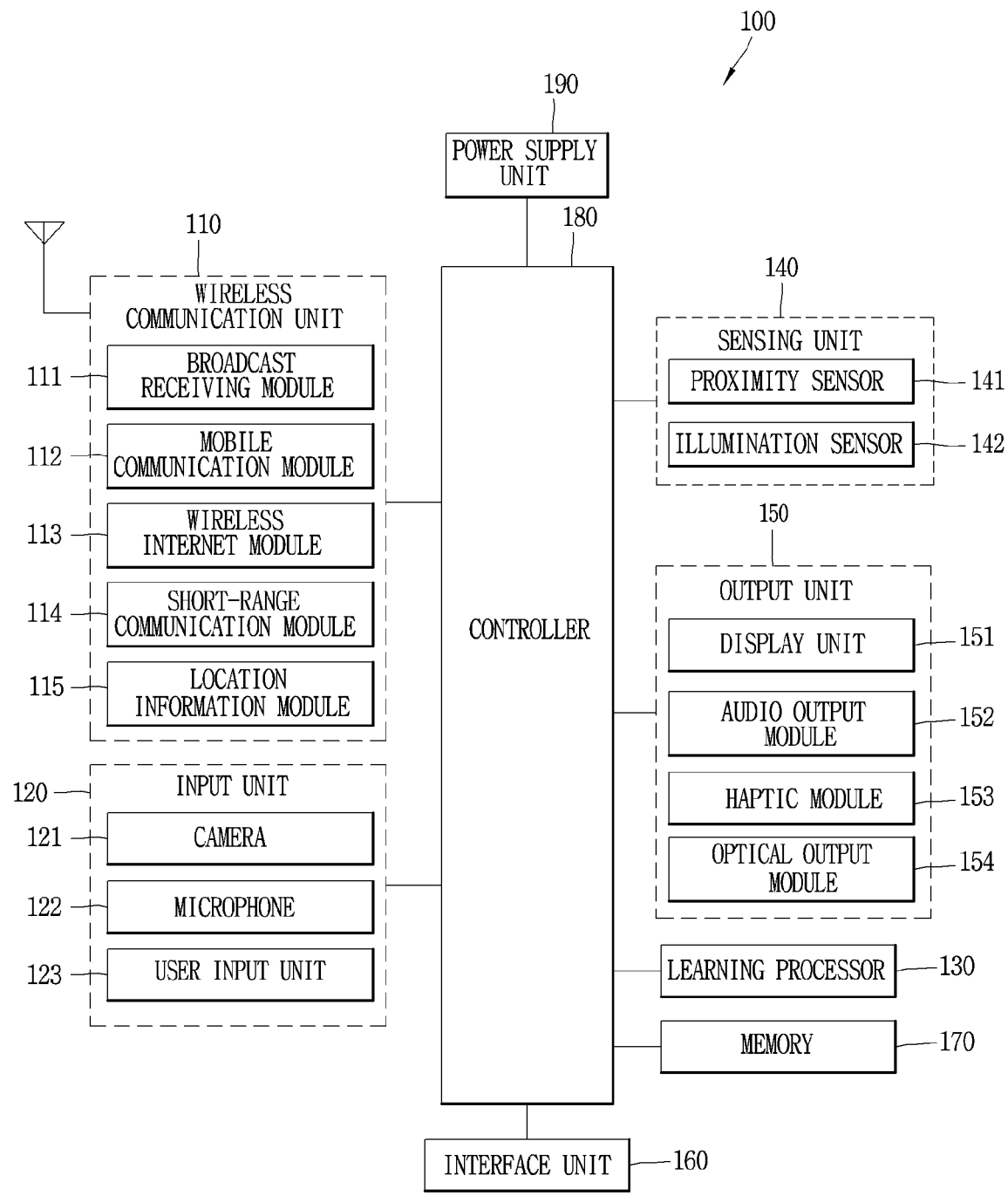
FIG. 1 is a block diagram for explaining an artificial intelligence device according to the present disclosure.

Description will now be given in detail according to exemplary embodiments disclosed herein, with reference to the accompanying drawings. For the sake of brief description with reference to the drawings, the same or equivalent elements may be provided with the same or similar reference numbers, and description thereof will not be repeated. A suffix "module" or "unit" used for elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure.

The terms including an ordinal number such as first, second, etc. can be used to describe various elements, but the elements should not be limited by those terms. These terms are only used to distinguish one element from another.

It should be understood that when an element is referred to as being "connected to" or "coupled to" another element, the element can be connected to the other element or intervening elements may also be present. On the contrary, in a case where an element is "directly connected to" or "directly coupled to" another element, it should be understood that any other element is not present therebetween.

The artificial intelligence device described in this specification may include cellular phones, smart phones, laptop computers, digital broadcast artificial intelligence devices, personal digital assistants (PDAs), portable multimedia players (PMPs), navigators, portable computers (PCs), slate PCs, tablet PCs, ultrabooks, wearable devices (e.g., smart watches, smart glasses, head mounted displays (HMDs)), and the like.

However, the artificial intelligence device 100 described in this specification is applicable to stationary artificial intelligence devices such as smart TVs, desktop computers or digital signages.

In addition, the artificial intelligence device 100 according to the embodiment of the present invention is applicable to stationary or mobile robots.

In addition, the artificial intelligence device 100 according to the embodiment of the present disclosure may perform the function of a speech agent. The speech agent may be a program that recognizes the user's speech and outputs a response as a speech that is suitable for the recognized user's speech.

The artificial intelligence device 100 may include a wireless communication unit 110, an input unit 120, a learning processor 130, a sensing unit 140, an output unit 150, an interface unit 160, a memory 170, a processor 180 and a power supply unit 190.

The wireless communication unit 110 may include one or more of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel.

The mobile communication module 112 may transmit/receive wireless signals to/from at least one of network entities, for example, a base station, an external terminal, a server, and the like, on a mobile communication network, which is constructed according to technical standards or transmission methods for mobile communications (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless Internet module 113 is configured to facilitate wireless Internet access. This module may be installed inside or outside the artificial intelligence device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input unit 120 may include a camera 121 for inputting an image signal, a microphone 122 for receiving an audio signal, and a user input unit 123 for receiving information from a user.

Speech data or image data collected by the input unit 120 may be analyzed and processed by a user's control command.

The input unit 120 may receive video information (or signal), audio information (or signal), data or user input information. For reception of video information, the artificial intelligence device 100 may include one or a plurality of cameras 121.

Such cameras 121 may process image frames of still pictures or video obtained by image sensors in a video or image capture mode. The processed image frames can be displayed on the display 151 or stored in memory 170.

The microphone 122 processes an external audio signal into electric speech data. The processed speech data may be variously used according to function (application program) executed in the artificial intelligence device 100. If desired, the microphone 122 may include assorted noise removing algorithms to remove unwanted noise generated in the course of receiving the external audio signal.

The user input unit 123 may receive information input by a user, and when information is input through the user input unit 123, the processor 180 may control an operation of the artificial intelligence device 100 to correspond to the input information.

The user input unit 123 may include one or more of a mechanical input element (e.g., a mechanical key, a button located on a front and/or rear surface or a side surface of the artificial intelligence device 100, a dome switch, a jog wheel, a jog switch, etc.) or a touch input element. For one example, the touch-sensitive input element may be a virtual key, a soft key or a visual key, which is displayed on a touch screen through software processing, or a touch key which is located on the mobile terminal at a location that is other than the touch screen.

The learning processor 130 may be configured to receive, classify, store and output information to be used for data mining, data analysis, intelligent decision, mechanical learning algorithms and techniques.

The learning processor 130 may include one or more memory units configured to store data received, detected, sensed, generated or output in a predetermined manner or another manner by the artificial intelligence device or received, detected, sensed, generated or output in a predetermined manner or another manner by another component, device, artificial intelligence device or device for communicating with the artificial intelligence device.

The learning processor 130 may include a memory integrated with or implemented in the artificial intelligence device. In some embodiments, the learning processor 130 may be implemented using the memory 170.

Selectively or additionally, the learning processor 130 may be implemented using a memory related to the artificial intelligence device, such as an external memory directly coupled to the artificial intelligence device or a memory maintained in a server communicating with the artificial intelligence device.

In another embodiment, the learning processor 130 may be implemented using a memory maintained in a cloud computing environment or another remote memory accessible by the artificial intelligence device through the same communication scheme as a network.

The learning processor 130 may be configured to store data in one or more databases in order to identify, index, categorize, manipulate, store, retrieve and output data to be used for supervised or unsupervised learning, data mining, predictive analysis or other machines.

Information stored in the learning processor 130 may be used by one or more other controllers of the artificial intelligence device or the processor 180 using any one of different types of data analysis algorithms and machine learning algorithms.

Examples of such algorithms include k-nearest neighbor systems, fuzzy logic (e.g., possibility theory), neural networks, Boltzmann machines, vector quantization, pulse neural networks, support vector machines, maximum margin classifiers, hill climbing, inductive logic system Bayesian networks, Petri Nets (e.g., finite state machines, Mealy machines or Moore finite state machines), classifier trees (e.g., perceptron trees, support vector trees, Markov trees, decision tree forests, random forests), betting models and systems, artificial fusion, sensor fusion, image fusion, reinforcement learning, augmented reality, pattern recognition, and automated planning.

The processor 180 may make a decision using data analysis and machine learning algorithms and determine or predict at least one executable operation of the artificial intelligence device based on the generated information. To this end, the processor 180 may request, retrieve, receive or use the data of the processor 130 and control the artificial intelligence device to execute preferable operation or predicted operation of at least one executable operation.

The processor 180 may perform various functions for implementing intelligent emulation (i.e., a knowledge based system, an inference system and a knowledge acquisition system). This is applicable to various types of systems (e.g., a fussy logic system) including an adaptive system, a machine learning system, an artificial neural system, etc.

The processor 180 may include a sub module for enabling operation involving speech and natural language speech processing, such as an I/O processing module, an environmental condition module, speech-to-text (STT) processing module, a natural language processing module, a workflow processing module and a service processing module.

Each of such sub modules may have an access to one or more systems or data and models at the artificial intelligence device or a subset or superset thereof. In addition, each of the sub modules may provide various functions including vocabulary index, user data, a workflow model, a service model and an automatic speech recognition (ASR) system.

In another embodiment, the other aspects of the processor 180 or the artificial intelligence device may be implemented through the above-described sub modules, systems or data and models.

In some embodiments, based on the data of the learning processor 130, the processor 180 may be configured to detect and sense requirements based on the context condition or user's intention expressed in user input or natural language input.

The processor 180 may actively derive and acquire information necessary to fully determine the requirements based on the context condition or user's intention. For example, the processor 180 may actively derive information necessary to determine the requirements, by analyzing historical data including historical input and output, pattern matching, unambiguous words, and input intention, etc.

The processor 180 may determine a task flow for executing a function for responding to the requirements based on the context condition or the user's intention.

The processor 180 may be configured to collect, sense, extract, detect and/or receive signals or data used for data analysis and machine learning operations through one or more sensing components at the artificial intelligence device, in order to collect information for processing and storage from the learning processor 130.

Information collection may include sensing information through a sensor, extracting information stored in the memory 170, or receiving information from another artificial intelligence device, an entity or an external storage device through a communication unit.

The processor 180 may collect and store usage history information from the artificial intelligence device.

The processor 180 may determine the best match for executing a specific function using the stored usage history information and predictive modeling.

The processor 180 may receive or sense surrounding environment information or other information through the sensing unit 140.

The processor 180 may receive broadcast signals and/or broadcast related information, wireless signals or wireless data through the wireless communication unit 110.

The processor 180 may receive image information (or signals corresponding thereto), audio signal (or signals corresponding thereto), data or user input information from the input unit 120.

The processor 180 may collect information in real time, process or classify the information (e.g., a knowledge graph, a command policy, a personalization database, a dialog engine, etc.), and store the processed information in the memory 170 or the learning processor 130.

When the operation of the artificial intelligence device is determined based on data analysis and machine learning algorithms and techniques, the processor 180 may control the elements of the artificial intelligence device in order to execute the determined operation. The processor 180 may control the terminal according to a control command and perform the determined operation.

When the specific operation is performed, the processor 180 may analyze historical information indicating execution of the specific operation through data analysis and machine learning algorithms and techniques and update previously learned information based on the analyzed information.

Accordingly, the processor 180 may improve accuracy of future performance of data analysis and machine learning algorithms and techniques based on the updated information, along with the learning processor 130.

The sensing unit 140 may include one or more sensors configured to sense internal information of the mobile artificial intelligence device, the surrounding environment of the mobile artificial intelligence device, user information, and the like.

For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., refer to the camera 121), a microphone 122, a battery gage, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). Meanwhile, the mobile artificial intelligence device disclosed herein may combine and utilize information obtained from at least two of these sensors.

The output unit 150 is configured to output various types of information, such as audio, video, tactile output, and the like. The output unit 150 may include a display 151, an audio output module 152, a haptic module 153, and a light output unit 154.

The display 151 displays (outputs) information processed by the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to implement a touch screen. The touch screen may provide an output interface between the artificial intelligence device 100 and a user, as well as function as the user input unit 123 which provides an input interface between the artificial intelligence device 100 and the user.

The audio output module 152 may output audio data received from the wireless communication unit 110 or stored in the memory 170 in a call signal reception mode, a call mode, a record mode, a speech recognition mode, a broadcast reception mode, and the like.

The audio output module 152 may include at least one of a receiver, a speaker, and a buzzer.

A haptic module 153 may generate various tactile effects that can be felt by a user. A representative example of a tactile effect generated by the haptic module 153 may be vibration.

A light output unit 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

The interface unit 160 serves as an interface with various types of external devices connected to the artificial intelligence device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the artificial intelligence device 100 may perform assorted control functions associated with a connected external device, in response to the external device being connected to the interface unit 160.

The identification module may be a chip that stores various information for authenticating authority of using the artificial intelligence device 100 and may include a user identity module (UIM), a subscriber identity module (SIM), a universal subscriber identity module (USIM), and the like. In addition, the device having the identification module (hereinafter, referred to as an "identification device") may take the form of a smart card. Accordingly, the identification device may be connected to the artificial intelligence device 100 through the interface unit 160.

The memory 170 stores data supporting various functions of the artificial intelligence device 100.

The memory 170 may store a plurality of application programs (or applications) executed in the artificial intelligence device 100, data for the operation of the artificial intelligence device 100, commands, and data for the operation of the learning processor 130 (e.g., at least one algorithm information for machine learning).

The processor 180 typically functions to control an overall operation of the artificial intelligence device 100, in addition to the operations associated with the application programs. The processor 180 may process signals, data, information, etc. input or output through the above-described elements or execute the application program stored in the memory 170, thereby processing or providing appropriate information or functions to the user.

Also, the processor 180 may control at least part of the elements illustrated in FIG. 1, to execute an application program stored in the memory 170. Further, the processor 180 may operate a combination of at least two of the elements included in the artificial intelligence device 100, in order to execute the application program.

The power supply unit 190 receives external or internal power to supply the power respective elements included in the artificial intelligence device 100 under the control of the processor 180. The power supply unit 190 may include a battery, and the battery may be a built-in battery or a replaceable battery.

Meanwhile, as described above, the processor 180 controls an operation related to an application program, and typically controls an overall operation of the artificial intelligence device 100. For example, the processor 180 may set or release a locked state for restricting a user from inputting a control command with respect to applications when the status of the artificial intelligence device satisfies a preset condition.

Figure 2:
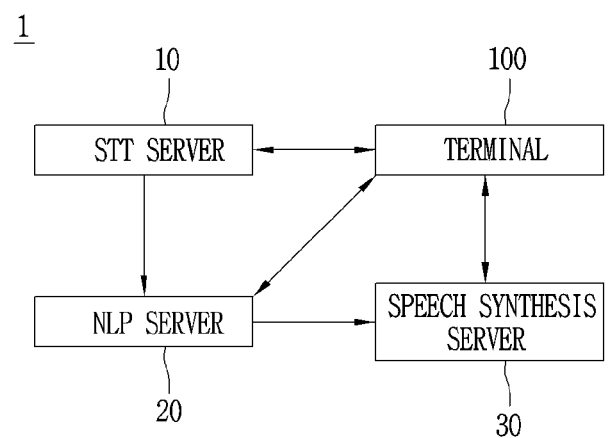
FIG. 2 is a diagram for explaining a speech system according to an embodiment of the present disclosure.

FIG. 2 is a diagram for explaining a speech system according to an embodiment of the present disclosure.

Referring to FIG. 2, the speech system 1 may include an artificial intelligence device 100, a speech-to-text (STT) server 10, a natural language processing (NLP) server 20 and a speech synthesis server 30.

The artificial intelligence device 100 may transmit speech data to the STT server 10. The STT server 10 may convert the speech data received from the artificial intelligence device 100 into text data.

The STT server 10 may increase the accuracy of speech-text conversion using a language model.

The language model may refer to a model capable of calculating a probability of a sentence or a probability of outputting a next word is output when previous words are given.

For instance, the language model may include probabilistic language models such as a unigram model, a bigram model, an N-gram model, etc.

The unigram model, which is a model that assumes that use of all words is completely independent of each other, calculates the probability of a word string by a product of the probabilities of words.

The bigram model is a model that assumes that use of words depends on only one previous word.

The N-gram model is a model that assumes that use of words depends on (n−1) previous words.

That is, the STT server 10 may determine whether speech data is appropriately converted into text data using the language model, thereby increasing the accuracy of conversion into the text data.

The NLP server 20 may receive the text data from the STT server 10. The NLP server 20 may analyze the intention of the text data based on the received text data.

The NLP server 20 may transmit intention analysis information indicating a result of performing intention analysis to the artificial intelligence device 100.

The NLP server 20 may sequentially perform a morpheme analysis step, a syntax analysis step, a speech act analysis step, a dialog processing step with respect to text data to generate intention analysis information.

The morpheme analysis step is a step of classifying the text data corresponding to the speech uttered by the user into morphemes as a smallest unit having a meaning and determining the part of speech of each of the classified morphemes.

The syntax analysis step is a step of classifying the text data into a noun phrase, a verb phrase, an adjective phrase, etc. using the result of the morpheme analysis step and determines a relation between the classified phrases.

Through the syntax analysis step, the subject, object and modifier of the speech uttered by the user may be determined.

The speech act analysis step is a step of analyzing the intention of the speech uttered by the user using a result of the syntax analysis step. Specifically, the speech act analysis step is a step of determining the intention of a sentence such as whether the user asks a question, makes a request, or expresses a simple emotion.

The dialog processing step is a step of determining whether to answer the user's utterance, respond to the user's utterance or ask for additional information using a result of the speech act analysis step.

The NLP server 20 may generate intention analysis information including at least one of an answer to, a response to, or asking for additional information on the intention of the user's utterance, subsequent to the dialog processing step.

Meanwhile, the NLP server 20 may receive text data from the artificial intelligence device 100. For example, when the artificial intelligence device 100 supports a speech-to-text conversion function, the artificial intelligence device 100 may convert speech data into text data, and transmit the converted text data to the NLP server 20.

The speech synthesis server 30 may synthesize prestored speech data to generate a synthesized speech.

The speech synthesis server 30 may record the speech of a person who is selected as a model, and divide the recorded speech into syllables or words. The speech synthesis server 30 may store the divided speech in an internal or external database in syllable or word units.

The speech synthesis server 30 may retrieve syllables or words corresponding to the given text data from the database and synthesize the retrieved syllables or words, thereby generating the synthesized speech.

The speech synthesis server 30 may store a plurality of speech language groups respectively corresponding to a plurality of languages.

For example, the speech synthesis server 30 may include a first speech language group recorded in Korean and a second speech language group recorded in English.

The speech synthesis server 30 may translate text data of a first language into text of a second language, and generate a synthesized speech corresponding to the translated text of the second language using the second speech language group.

The speech synthesis server 30 may transmit the synthesized speech to the artificial intelligence device 100.

The speech synthesis server 30 may receive the intention analysis information from the NLP server 20.

The speech synthesis server 30 may generate the synthesized speech including the intention of the user based on the intention analysis information.

In one embodiment, the STT server 10, the NLP server 20 and the speech synthesis server 30 may be implemented as a single server.

In the above, the respective functions of the STT server 10, the NLP server 20 and the speech synthesis server 30 may also be performed in the artificial intelligence device 100. To this end, the artificial intelligence device 100 may include a plurality of processors.

Figure 3:
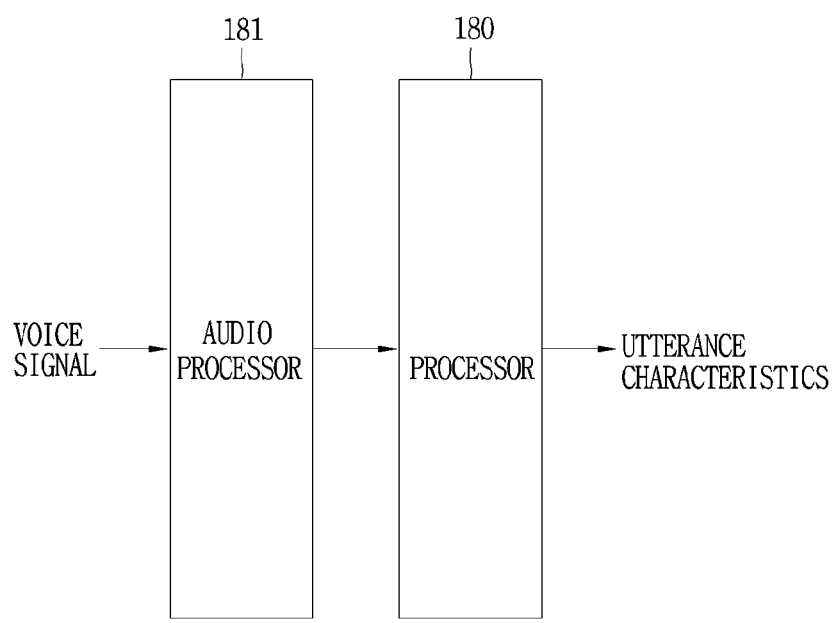
FIG. 3 is a diagram explaining a process of extracting utterance features of a user from a speech signal according to an embodiment of the present disclosure.

FIG. 3 is a diagram explaining a process of extracting utterance features of a user from a speech signal according to an embodiment of the present disclosure.

The artificial intelligence device 100 shown in FIG. 1 may further include an audio processor 181.

The audio processor 181 may be implemented as a chip separated from the processor 180 or a chip included in the processor 180.

The audio processor 181 may remove noise from the speech signal.

The audio processor 181 may convert the speech signal into text data. To this end, the audio processor 181 may include an STT engine.

The audio processor 181 may recognize a wake-up word for activating speech recognition of the artificial intelligence device 100. The audio processor 181 may convert the wake-up word received through the microphone 122 into text data and determine that the wake-up word is recognized when the converted text data corresponds to the prestored wake-up word.

The audio processor 181 may convert the speech signal, from which noise is removed, into a power spectrum.

The power spectrum may be a parameter indicating a frequency component included in the waveform of the speech signal varying with time, and a magnitude thereof.

The power spectrum shows a distribution of an amplitude squared value according to the frequency of the waveform of the speech signal.

This will be described with reference to FIG. 4.

Figure 4:
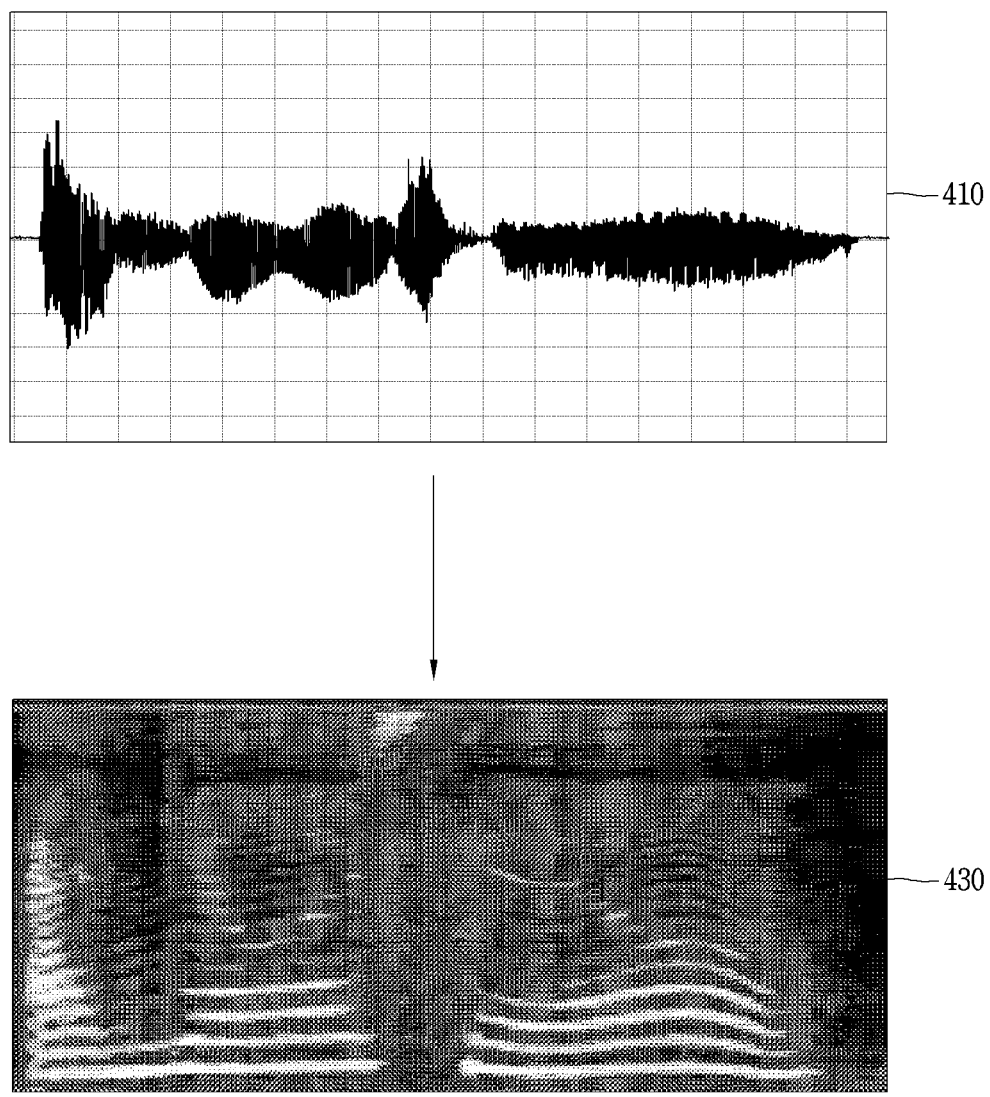
FIG. 4 is a diagram explaining an example of converting a speech signal into a power spectrum according to an embodiment of the present disclosure.

FIG. 4 is a diagram explaining an example of converting a speech signal into a power spectrum according to an embodiment of the present disclosure.

Referring to FIG. 4, the speech signal 410 is shown. The speech signal 410 may be received through the microphone 122 or prestored in the memory 170.

The x-axis of the speech signal 410 denotes a time and the y-axis denotes an amplitude.

The audio processor 181 may convert the speech signal 410, the x-axis of which is a time axis, into a power spectrum 430, the x-axis of which is a frequency axis.

The audio processor 181 may convert the speech signal 410 into the power spectrum 430 using fast Fourier transform (FFT).

The x-axis of the power spectrum 430 denotes a frequency and the y-axis of the power spectrum 430 denotes a squared value of an amplitude.

FIG. 3 will be described again.

The processor 180 may determine utterance features of a user using at least one of the power spectrum 430 or the text data received from the audio processor 181.

The utterance features of the user may include a gender of the user, a pitch of the user, a tone of the user, a topic uttered by the user, an utterance speed of the user, a voice volume of the user, and the like.

The processor 180 may acquire a frequency of the speech signal 410 and the amplitude corresponding to the frequency using the power spectrum 430.

The processor 180 may determine the gender of the user who utters a speech, using a frequency band of the power spectrum 430.

For example, the processor 180 may determine the gender of the user as a male when the frequency band of the power spectrum 430 is within a predetermined first frequency band range.

The processor 180 may determine the gender of the user as a female when the frequency band of the power spectrum 430 is within a predetermined second frequency band range. Here, the second frequency band range may be larger than the first frequency band range.

The processor 180 may determine the pitch of the speech using the frequency band of the power spectrum 430.

For example, the processor 180 may determine the pitch of the speech according to the amplitude within a specific frequency band range.

The processor 180 may determine the tone of the user using the frequency band of the power spectrum 430. For example, the processor 180 may determine a frequency band having a predetermined amplitude or more among the frequency bands of the power spectrum 430 as a main register of the user and determines the determined main register as the tone of the user.

The processor 180 may determine the utterance speed of the user through the number of syllables uttered per unit time from the converted text data.

The processor 180 may determine the topic uttered by the user using a bag-of-word model scheme with respect to the converted text data.

The bag-of-word model scheme is a scheme that extracts mainly used words based on the frequency of words in a sentence. Specifically, the bag-of-word model scheme is a scheme that extracts unique words from a sentence and expresses the frequency of the extracted words by a vector to determine the uttered topic as a feature.

For example, when words <running>, <physical strength>, and the like, frequently appears in the text data, the processor 180 may classify the topic uttered by the user into an exercise.

The processor 180 may determine the topic uttered by the user from the text data using a known text categorization scheme. The processor 180 may extract keywords from the text data and determine the topic uttered by the user.

The processor 180 may determine the voice volume of the user in consideration of the amplitude information in an entire frequency band.

For example, the processor 180 may determine the voice volume of the user based on an average or weighted average of amplitudes in each frequency band of the power spectrum.

The functions of the audio processor 181 and the processor 180 described with reference to FIGS. 3 and 4 may be performed in any one of the NLP server 20 and the speech synthesis server 30.

For example, the NLP server 20 may extract the power spectrum using the speech signal and determine the utterance features of the user using the extracted power spectrum.

Figure 5:
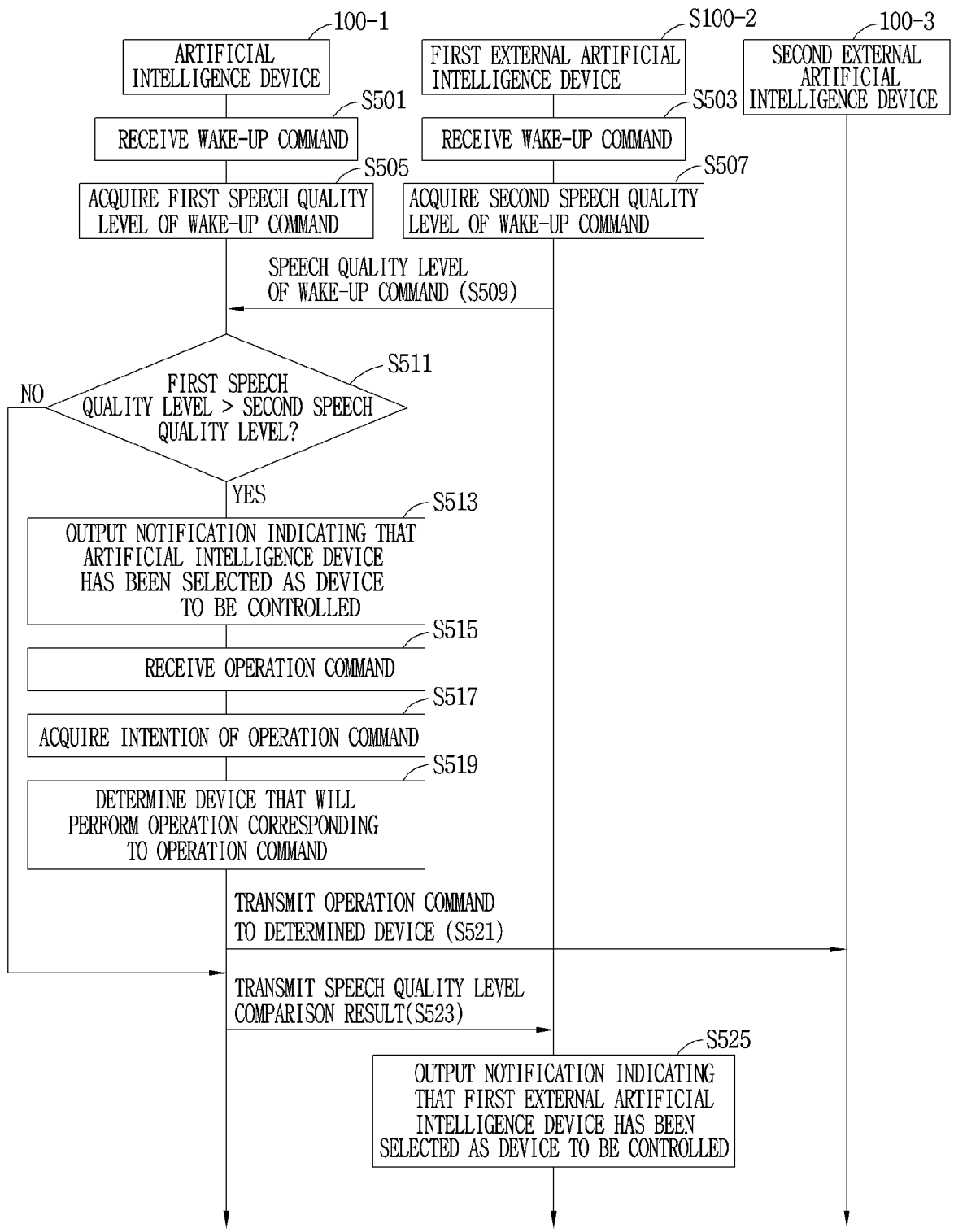
FIG. 5 is a diagram explaining a method of operating an artificial intelligence system according to an embodiment of the present disclosure.

FIG. 5 is a diagram explaining a method of operating an artificial intelligence system according to an embodiment of the present disclosure.

The artificial intelligence system may include an artificial intelligence device 100-1, a first external artificial intelligence device 100-2, and a second external artificial intelligence device 100-3.

Each of the artificial intelligence device 100-1, the first external artificial intelligence device 100-2, and the second external artificial intelligence device 100-3 may include all the elements shown in FIG. 1.

Meanwhile, although the artificial intelligence system includes three artificial intelligence devices in FIG. 5, this is merely an example and more artificial intelligence devices may be included therein.

Each of the microphone 122 of the artificial intelligence device 100-1 and the microphone 122 of the first external artificial intelligence device 100-2 receive a wake-up command (S501, S503).

In one embodiment, the wake-up command may be a speech command of the user used to activate a specific artificial intelligence device.

Although only the artificial intelligence device 100-1 and the first external artificial intelligence device 100-2 are shown as receiving the wake-up command in FIG. 5, this is merely an example and the second external artificial intelligence device 100-3 may also receive the wake-up command.

The processor 180 of the artificial intelligence device 100-1 acquires a first speech quality level of the received wake-up command (S505), and the first external artificial intelligence device 100-2 acquires a second speech quality level of the wake-up command (S507).

The processor 180 may acquire the first speech quality level indicating the speech level of the received wake-up command.

For an example, the processor 180 may acquire a keyword speech to ambient noise ratio (KSANR) on the time axis as the first speech quality level.

That is, the processor 180 may measure the ratio of the power of the keyword speech to the power of ambient noise on the time axis with respect to the received wake-up command and acquire the measured ratio as the first speech quality level.

In another example, the processor 180 may measure a ratio of a signal of a keyword speech section to a signal of a noise section (signal-to-noise ratio (SNR)) in the frequency domain and acquire the measured ratio as the first speech quality level.

That is, the processor 180 may acquire a signal to noise ratio of a keyword speech section in the frequency domain as the first speech quality level, with respect to the received wake-up command.

Similarly, the processor 180 of the first external artificial intelligence device 100-2 may acquire any one of the KSANR and SNR of the received wake-up command as the second speech quality level.

Meanwhile, the processor 180 may extract a keyword speech, speech noise and ambient noise from the wake-up command. The processor 180 may measure a speech quality level such as the KSANR or the SNR using the result of extraction.

In another example, the speech quality level may indicate whether the volume of the wake-up command is within an appropriate range.

For example, when the volume of the wake-up command received by the artificial intelligence device 100-1 is within the appropriate range and the volume of the wake-up command received by the first external artificial intelligence device 100-2 is not within the appropriate range, it may be determined that the first speech quality level of the wake-up command received by the artificial intelligence device 100-1 is higher than the second speech quality level of the wake-up command received by the first external artificial intelligence device 100-2.

In this case, the speech quality level may include the volume of the wake-up command received by the external artificial intelligence device or information on whether the volume of the wake-up command is within the appropriate range.

Figure 6:
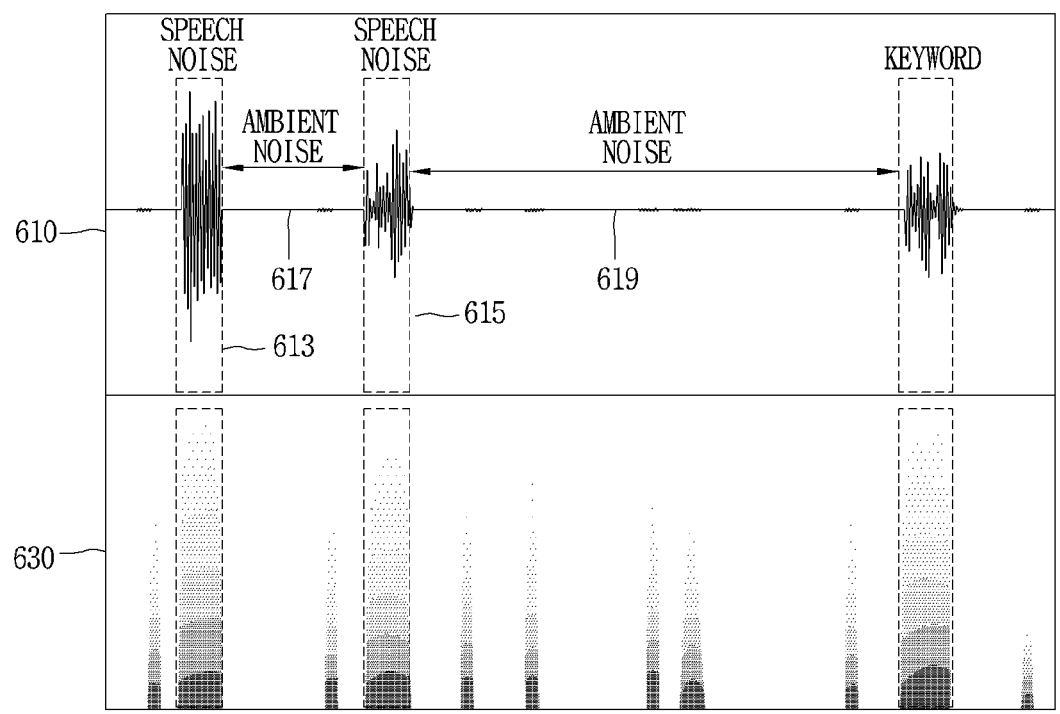
FIG. 6 is a diagram explaining an example of measuring a speech quality level according to an embodiment of the present disclosure.

FIG. 6 is a diagram explaining an example of measuring a speech quality level according to an embodiment of the present disclosure.

Referring to FIG. 6, a speech signal 610 corresponding to the wake-up command input through the microphone 122 and the power spectrum 430 of the speech signal 610 are shown.

The audio processor 181 may extract a keyword speech 611, speech noises 613, 615 and ambient noises 617, 619 from the speech signal 610.

When a speech pattern of a specific section of the speech signal 610 matches a predetermined noise pattern by a predetermined ratio or more, the audio processor 181 may classify the section into speech noise.

Similarly, when a speech pattern of a specific section of the speech signal 610 matches a predetermined ambient noise pattern by a predetermined ratio or more, the audio processor 181 may classify the section into ambient noise.

The audio processor 181 may determine a section excluding the speech noise and the ambient noise from the speech signal 610 as the keyword speech.

The audio processor 181 or the processor 180 may acquire a speech quality level using the keyword speech 611, the speech noises 613, 615 and the ambient noises 617, 619 extracted from the speech signal 610.

For an example, the audio processor 181 or the processor 180 may measure a ratio of the power corresponding to the keyword speech 611 to the power corresponding to the ambient noises 617, 619 and acquire the measured ratio as the speech quality level. Here, the power may be an amplitude or power calculated through the amplitude.

In another example, the audio processor 181 or the processor 180 may measure a ratio of the power of the power spectrum corresponding to the keyword speech 611 to the power of the power spectrum corresponding to the noises 613, 615, 617, 619 and acquire the measured ratio as the speech quality level.

FIG. 5 will be described again.

The processor 180 of the artificial intelligence device 100-1 receives the second speech quality level from the first external artificial intelligence device 100-2 through the wireless communication unit 110 (S509).

The processor 180 may receive the second speech quality level from the first external artificial intelligence device 100-2 through the short-range communication module 114.

The processor 180 of the artificial intelligence device 100-1 compares the first speech quality level with the second speech quality level, and determines whether the first speech quality level is higher than the second speech quality level (S511).

In one embodiment, the processor 180 may determine which of the KSANR of the wake-up command received by the artificial intelligence device 100-1 and the KSANR of the wake-up command received by the first external artificial intelligence device 100-2 is larger through comparison.

When the KSANR of the wake-up command received by the artificial intelligence device 100-1 is larger than the KSANR of the wake-up command received by the first external artificial intelligence device 100-2, the processor 180 may determine that the first speech quality level is higher than the second speech quality level.

On the contrary, when the KSANR of the wake-up command received by the artificial intelligence device 100-1 is smaller than the KSANR of the wake-up command received by the first external artificial intelligence device 100-2, the processor 180 may determine that the first speech quality level is lower than the second speech quality level.

For another example, the processor 180 may determine which of the SNR of the wake-up command received by the artificial intelligence device 100-1 and the SNR of the wake-up command received by the first external artificial intelligence device 100-2 is larger through comparison.

When the SNR of the wake-up command received by the artificial intelligence device 100-1 is larger than the SNR of the wake-up command received by the first external artificial intelligence device 100-2, the processor 180 may determine that the first speech quality level is higher than the second speech quality level.

On the contrary, the SNR of the wake-up command received by the artificial intelligence device 100-1 is smaller than the SNR of the wake-up command received by the first external artificial intelligence device 100-2, the processor 180 may determine that the first speech quality level is lower than the second speech quality level.

When the first speech quality level is higher than the second speech quality level, the processor 180 of the artificial intelligence device 100-1 outputs a notification indicating that the artificial intelligence device 100-1 is selected as an object to be controlled (S513).

When the first speech quality level is higher than the second speech quality level, the processor 180 may output a notification indicating that the artificial intelligence device 100-1 is selected according to the wake-up command of the user.

That is, a notification that the artificial intelligence device 100-1 has been activated according to the wake-up command may be output.

The processor 180 may audibly output the notification through the audio output module 152 or output specific light through the light output unit 154.

The processor 180 may output specific light while audibly outputting the notification. Then, the microphone 122 of the artificial intelligence device 100-1 receives an operation command (S515), and the processor 180 acquires the intention of the received operation command (S517).

For an example, the processor 180 may convert the operation command into text and transmit the converted text to the NLP server 20 shown in FIG. 2.

The processor 180 may receive an intention analysis result of the NLP server 20 from the NLP server 20.

The intention analysis result may include an artificial intelligence device that will perform an operation command and operation that must be performed by the external artificial intelligence device.

For another example, the processor 180 may autonomously acquire the intention of the operation command.

The processor 180 may include a natural language processing engine capable of performing the function of the NLP server 20, and analyze the intention of the operation command using the natural language processing engine.

The processor 180 of the artificial intelligence device 100-1 determines a device that will perform an operation corresponding to the operation command based on the acquired intention (S519).

The processor 180 may determine a device capable of performing an operation according to the acquired intention from among the plurality of external artificial intelligence devices. Each of the plurality of external artificial intelligence devices may be a device connected to the artificial intelligence device 100-1 or a connectable device.

The processor 180 may select a device capable of performing an operation according to the acquired intention from among the artificial intelligence device 100-1, the first external artificial intelligence device 100-2 and the second external artificial intelligence device 100-3.

The processor 180 of the artificial intelligence device 100-1 transmits the operation command to the determined second external artificial intelligence device 100-2 through the wireless communication unit 110 (S521).

The second external artificial intelligence device 100-2 may receive the operation command from the artificial intelligence device 100-1, and perform an operation corresponding to the received operation command.

Meanwhile, when it is determined that the first speech quality level is lower than the second speech quality level, the processor 180 of the artificial intelligence device 100-1 transmits the result of comparing the speech quality levels to the first external artificial intelligence device 100-2 (S523).

The result of comparing the speech quality levels may include information indicating which of the first speech quality level and the second speech quality level is higher.

The processor 180 may transmit a message indicating that the first external artificial intelligence device 100-2 is selected as a device to be controlled according to utterance of the user to the first external artificial intelligence device 100-2, in addition to the result of comparing the speech quality levels.

When the first speech quality level is lower than the second speech quality level, the artificial intelligence device 100-1 may not be activated and may be maintained in a deactivation state according to reception of the wake-up command.

The first external artificial intelligence device 100-2 outputs a notification indicating that the first external artificial intelligence device 100-2 is selected as an object to be controlled based on the received result of comparing the speech quality levels (S525).

Figure 7:
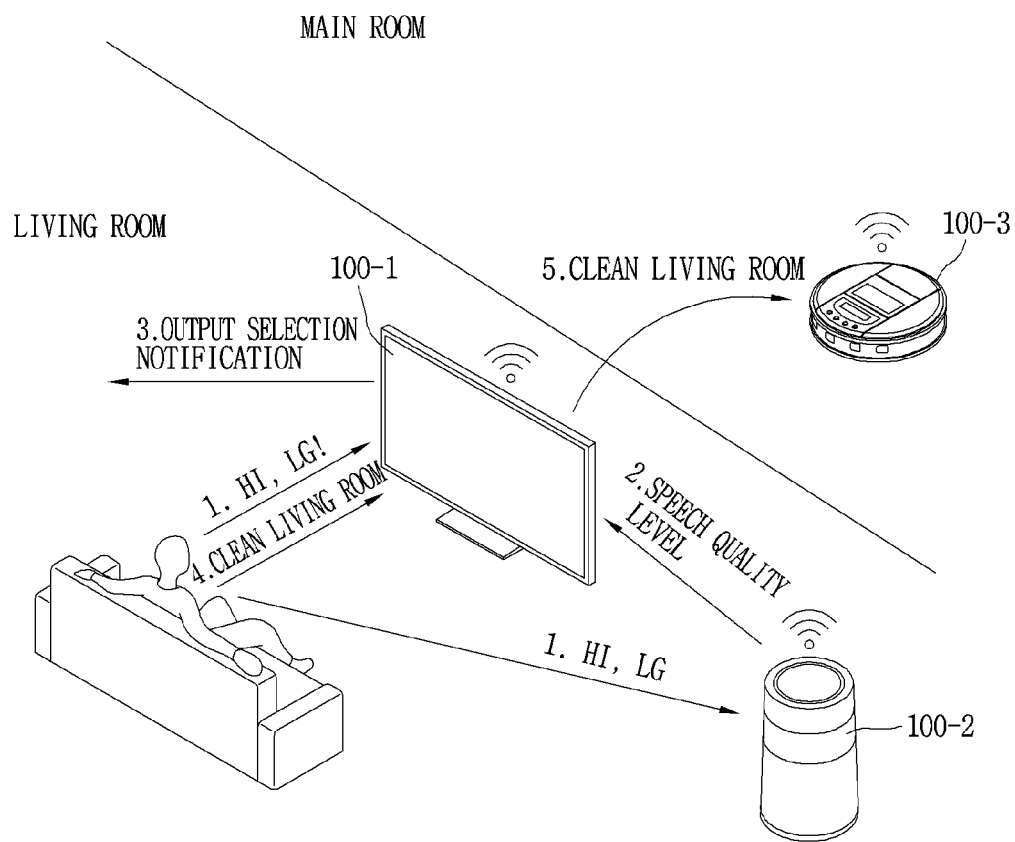
FIG. 7 is a diagram for explaining an actual use scenario of the method of operating the artificial intelligence system shown in FIG. 5.

FIG. 7 is a diagram for explaining an actual use scenario of the method of operating the artificial intelligence system shown in FIG. 5.

Referring to FIG. 7, it is assumed that the artificial intelligence device 100-1 is a smart TV, the first external artificial intelligence device 100-2 is an air cleaner, and the second external artificial intelligence device 100-3 is a robot cleaner.

In addition, the artificial intelligence device 100-1 and the first external artificial intelligence device 100-2 are located in a living room and the second external artificial intelligence device 100-3 is located in a main room.

It is assumed that the second external artificial intelligence device 100-3 is far from the user not to receive or recognize the speech command uttered by the user.

A user utters a wake-up command <Hi, LG!>.

The artificial intelligence device 100-1 and the first external artificial intelligence device 100-2 receive the wake-up command <Hi, LG!> uttered by the user.

The artificial intelligence device 100-1 may acquire the first speech quality level of the wake-up command received by artificial intelligence device 100-1 itself.

In addition, the artificial intelligence device 100-1 may receive the second speech quality level of the wake-up command received by the first external artificial intelligence device 100-2 from the first external artificial intelligence device 100-2.

The artificial intelligence device 100-1 may compare the first speech quality level with the second speech quality level and output a notification that the artificial intelligence device 100-1 itself is selected as an object to be controlled when the first speech quality level is higher than the second speech quality level.

Simultaneously, the artificial intelligence device 100-1 may transmit, to the first external artificial intelligence device 100-2, a message indicating that artificial intelligence device 100-1 is selected as the object to be controlled.

The first external artificial intelligence device 100-2 may not be activated according to the message received from the artificial intelligence device 100-1, even though the wake-up command has been received from the user.

As described above, according to the embodiment of the present disclosure, only any one of the plurality of artificial intelligence devices activated by one wake-up command may be selected as the object to be controlled.

Therefore, it is possible to prevent a plurality of artificial intelligence devices from being activated by one wake-up command, thereby preventing confusion.

Figure 8:
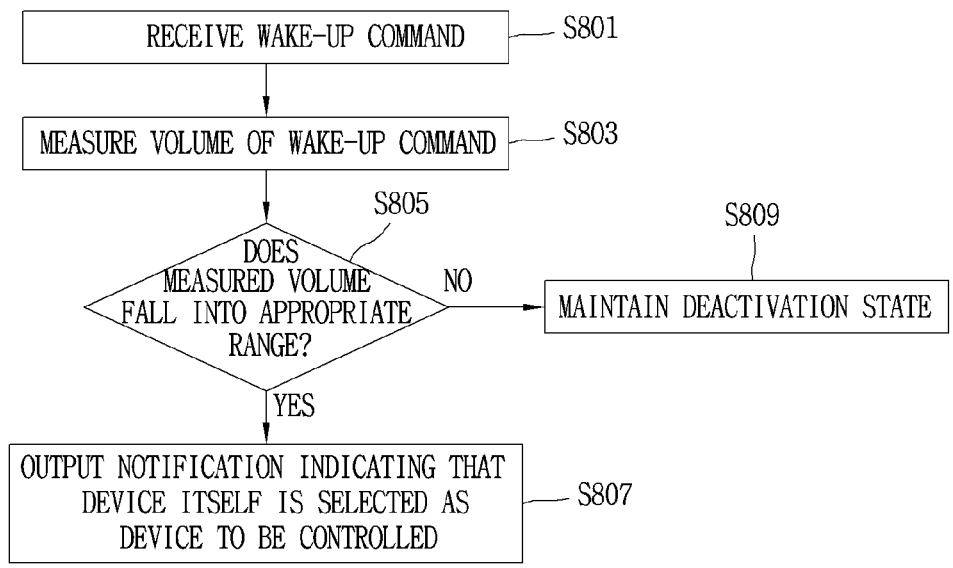
FIG. 8 is a flowchart for explaining a method of operating an artificial intelligence device according to an embodiment of the present disclosure.

FIG. 8 is a flowchart for explaining a method of operating an artificial intelligence device according to an embodiment of the present disclosure.

The microphone 122 of the artificial intelligence device 100 receives the wake-up command (S801).

The processor 180 of the artificial intelligence device 100 measures the volume of the received wake-up command (S803).

When the wake-up command is received through the microphone 122, the processor 180 may measure the volume of the received wake-up command.

The measured volume may be expressed in decibel, but this is only an example.

The processor 180 of the artificial intelligence device 100 determines whether the measured volume is within an appropriate range (S805).

In one embodiment, the appropriate range may be a range of a volume required for the artificial intelligence device 100 to change to an activation state according to the wake-up command.

For example, the appropriate range may be from 40 to 60, but this is merely an example. The appropriate range may be a range that can be set by the user when each artificial intelligence device is disposed in the home. That is, the appropriate range may be registered in each device according to a user input.

When it is determined that the measured volume is within the appropriate range, the processor 180 of the artificial intelligence device 100 outputs a notification indicating that the artificial intelligence device 100 is selected as an object to be controlled (S807).

When it is determined that the measured volume is within the appropriate range, the processor 180 may change the deactivation state of the artificial intelligence device 100 to the activation state in response to the wake-up command.

The deactivation state of the artificial intelligence device 100 may be a state in which the artificial intelligence device 100 does not respond to the operation command uttered by the user.

The activation state of the artificial intelligence device 100 may be a state in which the artificial intelligence device 100 can perform an operation corresponding to the operation command in response to the operation command uttered by the user.

When it is determined that the measured volume is within the appropriate range, the processor 180 may output a notification indicating that the artificial intelligence device 100 is selected as an object to be controlled through the audio output module 152 or the light output unit 154.

Meanwhile, when it is determined that the measured volume is not within the appropriate range, the processor 180 of the artificial intelligence device 100 maintains the deactivation state (S809).

That is, the processor 180 may not perform any operation even when the operation command uttered by the user is input to the microphone 122.

Figure 9:
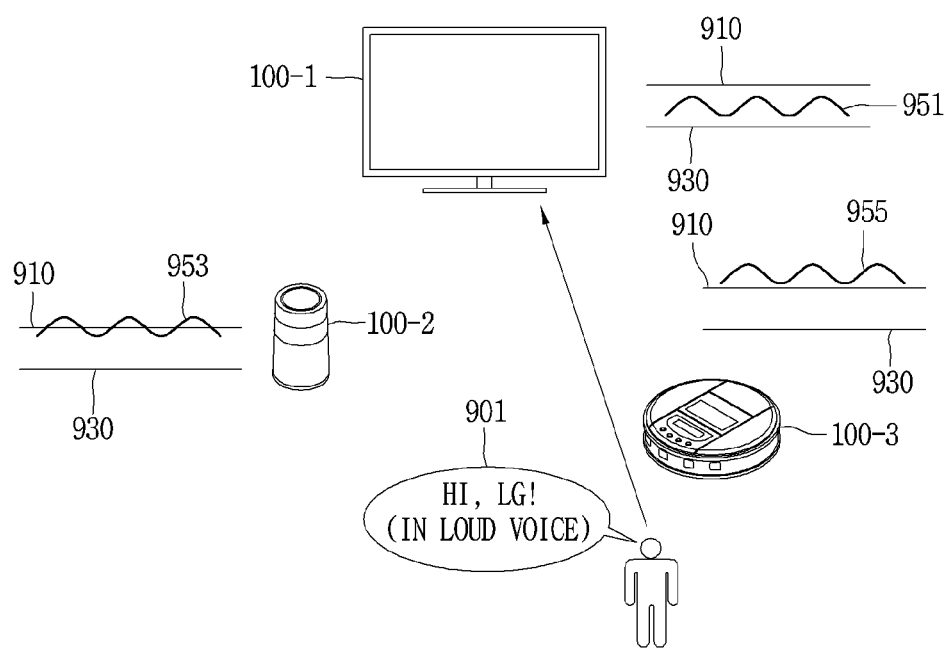
FIGS. 9 and 10 are diagrams explaining a process of selecting any one device from among a plurality of artificial intelligence devices as an object to be controlled in response to a wake-up command of a user according to an embodiment of the present disclosure.
Figure 10:
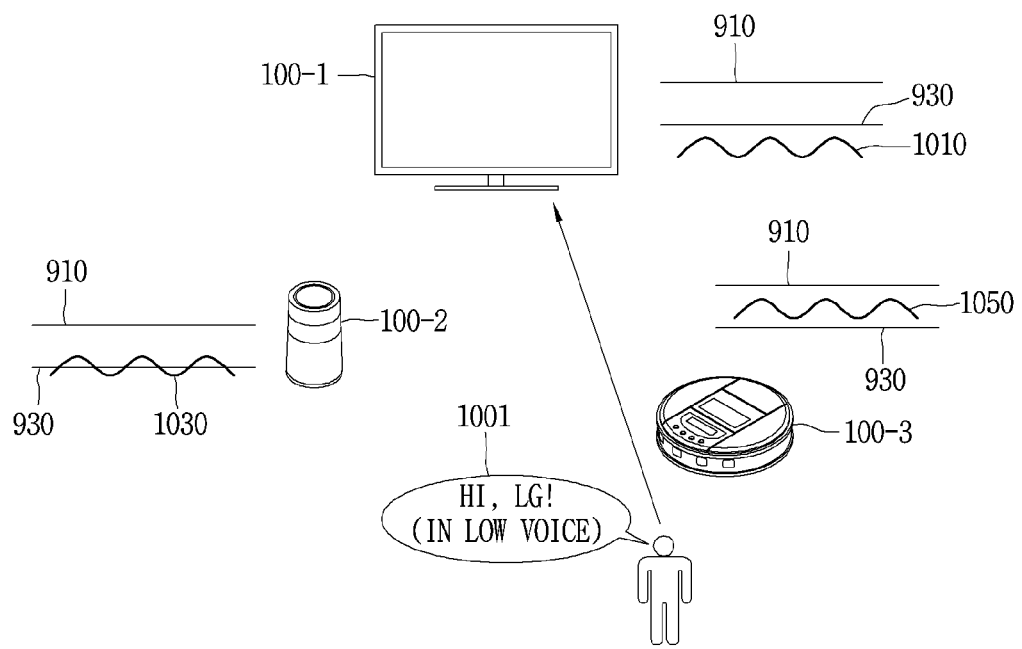

FIGS. 9 and 10 are diagrams explaining a process of selecting any one device from among a plurality of artificial intelligence devices as an object to be controlled in response to a wake-up command of a user according to an embodiment of the present disclosure.

Referring to FIGS. 9 and 10, the artificial intelligence device 100-1, the first external artificial intelligence device 100-2 and the second external artificial intelligence device 100-3 are disposed.

It is assumed that the appropriate ranges of the volumes set to change the artificial intelligence device 100-1, the first external artificial intelligence device 100-2 and the second external artificial intelligence device 100-3 to the activation state according to the wake-up command are the same, from 40 to 60.

The appropriate range may be a range from an upper limit value 910 to a lower limit value 930.

In addition, it is assumed that a distance between the user and the artificial intelligence device 100-1 is larger than a second distance between the user and the first external artificial intelligence device 100-2 and a third distance between the user and the second external artificial intelligence device 100-3 is smaller than the second distance.

First, referring to FIG. 9, the user utters a wake-up command 901 <Hi, LG!> in a loud voice.

The artificial intelligence device 100-1 may determine whether the volume of a first speech signal 951 of the wake-up command 901 input through the microphone 122 is between the upper limit value 910 and the lower limit value 930.

As shown in FIG. 9, when the volume of the first speech signal 951 of the wake-up command 901 is between the upper limit value 910 and the lower limit value 930, the artificial intelligence device 100-1 may be selected as an object to be controlled by the wake-up command 901.

That is, the artificial intelligence device 100-1 may be activated according to the wake-up command 901.

Since the volume of a second speech signal 953 of the wake-up command 901 input through the microphone 122 is in a section that is larger than the lower limit value 930, but exceeds the upper limit value 910, the first external artificial intelligence device 100-2 may determine that the volume of the second speech signal 953 is not within the appropriate range.

That is, since the volume of the wake-up command 901 is not within the appropriate range, the first external artificial intelligence device 100-2 may not be activated even when the wake-up command 901 is input to the microphone 122.

Since the volume exceeds the upper limit value 910 in an entire range of the third the speech signal 955 of the wake-up command 901 input through the microphone 122, the second external artificial intelligence device 100-3 may determine that the volume of the third speech signal 955 is not within the appropriate range.

That is, since the volume of the wake-up command 901 is not within the appropriate range, the second external artificial intelligence device 100-3 may not be activated even when the wake-up command 901 is input to the microphone 122.

According to the embodiment of the present disclosure, the user may visually determine a distance from a device to be controlled, and utter the wake-up command in a loud voice when the device to be controlled is far therefrom, thereby easily selecting the desired device as an object to be controlled.

Next, referring to FIG. 10, the user utters a wake-up command 1001<Hi, LG!> in a low voice.

Each artificial intelligence device may determine whether the volume of the wake-up command 1001 input through the microphone is within the appropriate range.

The artificial intelligence device 100-1 may determine that the volume of the fourth speech signal 1010 is not within the appropriate range since the volume of the fourth speech signal 1010 of the wake-up command 1001 input to the microphone 122 thereof is smaller than the lower limit value 930.

That is, the artificial intelligence device 100-1 may not be activated in response to the wake-up command 1001.

The first external artificial intelligence device 100-2 may determine that the volume of the fifth speech signal 1030 is not within the appropriate range since there exists a section in which the volume of the fifth speech signal 1030 of the wake-up command 1001 input to the microphone 122 thereof is smaller than the lower limit value 930.

That is, the first external artificial intelligence device 100-2 may not be activated in response to the wake-up command 1001.

The second external artificial intelligence device 100-3 may be selected as an object to be controlled by the wake-up command 1001 since the volume of the sixth speech signal 1050 of the wake-up command 1001 input to the microphone 122 thereof is within the appropriate range in the entire section.

According to the embodiment of the present disclosure, the user may visually determine a distance to a device to be controlled, and utter the wake-up command in a low voice when the device to be controlled is close thereto, thereby easily selecting a desired device as an object to be controlled.

In addition, in the embodiments of FIGS. 9 and 10, since only any one device is activated according to the utterance of the same wake-up command, it is possible to prevent a plurality of devices from being activated, thereby preventing congestion.

Figure 11:
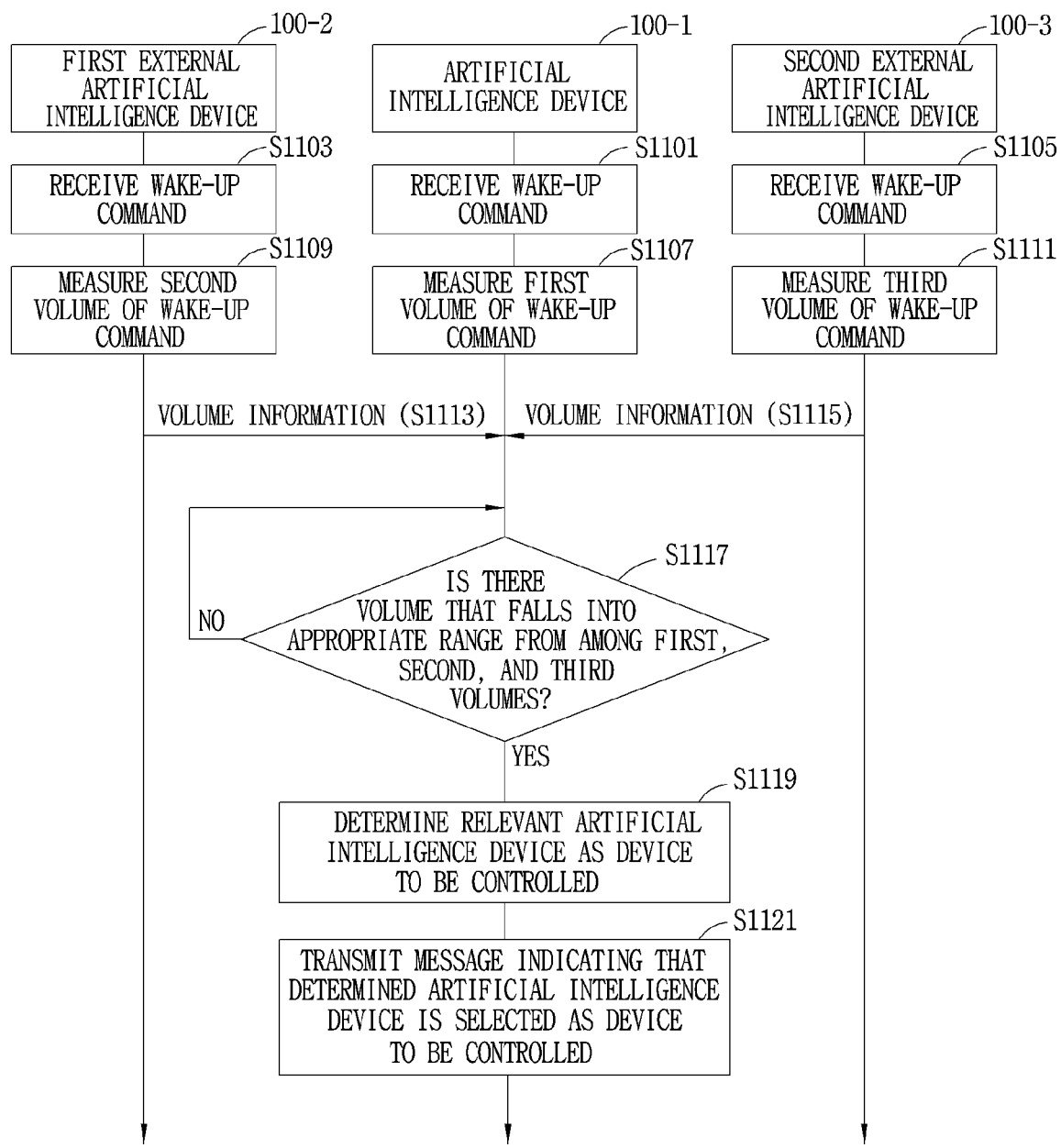
FIG. 11 is a ladder diagram for explaining a method of operating an artificial intelligence system according to another embodiment of the present disclosure.

FIG. 11 is a ladder diagram for explaining a method of operating an artificial intelligence system according to another embodiment of the present disclosure.

In particular, FIG. 11 is a diagram explaining an example in which any one of a plurality of artificial intelligence devices becomes a master device to select an object to be controlled according to the wake-up command.

Referring to FIG. 11, each of the artificial intelligence device 100-1, the first external artificial intelligence device 100-2 and the second external artificial intelligence device 100-3 receives the wake-up command through the microphone 122 (S1101, S1103, S1105).

The processor 180 of the artificial intelligence device 100-1 measures a first volume of the wake-up command (S1107), the first external artificial intelligence device 100-2 measures a second volume of the wake-up command (S1109), and the second external artificial intelligence device 100-3 measures a third volume of the wake-up command (S1111).

The processor 180 of the artificial intelligence device 100-1 receives the volume information including the second volume from the first external artificial intelligence device 100-2 through the wireless communication unit 110 (S1113), and receives the volume information including the third volume from the second external artificial intelligence device 100-3 (S1115).

The processor 180 of the artificial intelligence device 100-1 determines whether any one of the first volume, the second volume and the third volume is within the appropriate range (S1117).

When any one volume is within the appropriate range, the processor 180 of the artificial intelligence device 100-1 determines a device corresponding to the volume as an object to be controlled (S1119).

The processor 180 of the artificial intelligence device 100-1 transmits, to the determined device, a message indicating that the determined device is selected as an object to be controlled through the wireless communication unit 110 (S1121).

For example, when the second volume corresponding to the first external artificial intelligence device 100-2 is within the appropriate range, the processor 180 may transmit a message indicating that the first external artificial intelligence device 100-2 is selected as the object to be controlled, to the first external artificial intelligence device 100-2, through the wireless communication unit 110.

The first external artificial intelligence device 100-2 may change its state to an active state according to a message received from the artificial intelligence device 100-1.

When the artificial intelligence device 100-1 itself is selected as an object to be controlled, the processor 180 may omit step S1121.

When the artificial intelligence device 100-1 is selected as an object to be controlled, the processor 180 may output a notification indicating this.

As described above, according to the embodiment of FIG. 11, the mater device may efficiently select the object to be controlled according to the utterance of the wake-up command of the user.

Meanwhile, when an obstacle is present between the user and the artificial intelligence device, the speech signal of the wake-up command may be reflected from the obstacle, thereby activating a device undesired by the user.

Accordingly, it is necessary to select the object to be controlled in consideration of the speech signal reflected by the obstacle.

Figure 12:
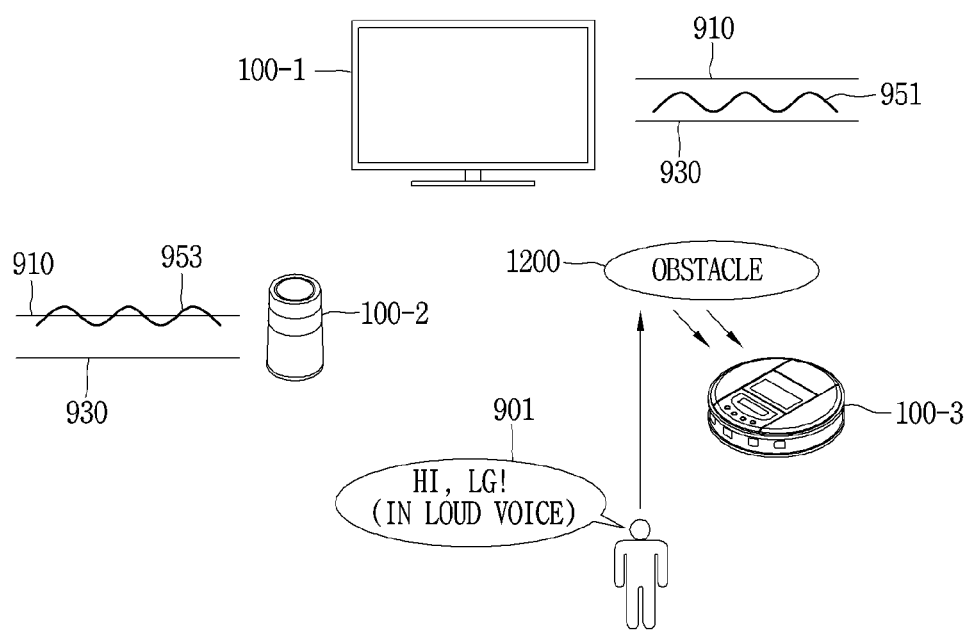
FIGS. 12 and 13 are diagrams explaining a method of correcting the volume of a wake-up command when an obstacle is present between a user and an artificial intelligence device.
Figure 13:
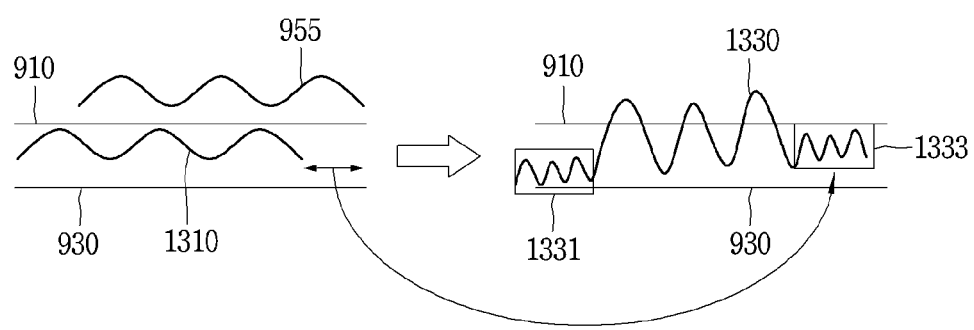

FIGS. 12 and 13 are diagrams explaining a method of correcting the volume of a wake-up command when an obstacle is present between a user and an artificial intelligence device.

FIG. 12 is a diagram in which an obstacle 1200 is further disposed based on the embodiment of FIG. 9.

A user utters a wake-up command 901 in a loud voice in order to select a farthest artificial intelligence device 100-1 from among artificial intelligence devices.

However, due to presence of the obstacle 1200, the speech signal of the wake-up command 901 may be reflected from the obstacle and the reflected signal may be input to the second external artificial intelligence device 100-2.

That is, the speech signal 955 of the wake-up command 901 and the reflected signal 1310 generated by reflecting the speech signal 955 at the obstacle 1200 may be input to the microphone 122 of the second external artificial intelligence device 100-2.

When the reflected signal 1310 is within the appropriate range, even though the user utters the wake-up command 901 in a loud voice in order to select the artificial intelligence device 100-1, the second external artificial intelligence device 100-3 may also be activated.

When the artificial intelligence device 100-1 and the second external artificial intelligence device 100-3 are activated in response to the wake-up command 901, the two devices respond to the operation command of the user, thereby increasing confusion.

To this end, each artificial intelligence device may measure an echo time of the wake-up command 901, thereby measuring presence of the obstacle.

The echo time means a time required to reduce the volume of the speech signal received through the microphone 122 by 60 dB.

When a reverberation time period of the speech signal corresponding to the wake-up command 901 is above a preset time period, the second external artificial intelligence device 100-3 may determine that the obstacle is detected.

The signal input to the second external artificial intelligence device 100-3 may include the speech signal 955 and the reflected signal 1310 input with a time difference after being reflected from the obstacle 1200.

When the speech signal 955 and the reflected signal 1310 are input, the echo time may generally exceed a predetermined time, due to the influence of the reflected signal 1310 input with the time difference.

When the reverberation time period is above a preset time period and it is determined that the obstacle is detected, the second external artificial intelligence device 100-3 may analyze the waveform of a synthesized signal 1330 obtained by synthesizing the speech signal 955 and the reflected signal 1310.

The second external artificial intelligence device 100-3 may extract time difference signals 1331, 1333 generated due to a time difference between the speech signal 955 and the reflected signal 1310 from the synthesized signal 1330.

The second external artificial intelligence device 100-3 may not consider the extracted time difference signals 1331, 1333 when it is determined whether the volume of the synthesized speech 1330 is within the appropriate range.

That is, the second external artificial intelligence device 100-3 may determine the extracted time difference signals 1331, 1333 as an error signal and determine whether the volume of the remaining synthesized signal excluding the extracted time difference signals 1331, 1333 is within the appropriate range.

Since some of the remaining synthesized signal excluding the time difference signals 1331, 1333 exceed an upper limit value 910, the second external artificial intelligence device 100-3 may determine that the volume of the remaining synthesized signal is not within the appropriate range.

Accordingly, the second external artificial intelligence device 100-3 may not be activated according to the input of the wake-up command 901.

As described above, according to the embodiment of the present disclosure, even when an obstacle is present, the user can select a desired device to be controlled according to the volume of the wake-up command.

Meanwhile, in a state in which an object to be controlled is selected, the user may utter an operation command while moving. When the user utters the operation command while moving, the volume of the operation command received by the device may be changed, and thus the volume may not be within the appropriate range.

Accordingly, in the present disclosure, a method of detecting the movement of a user to adaptively adjust the appropriate range of a volume is proposed.

Figure 14:
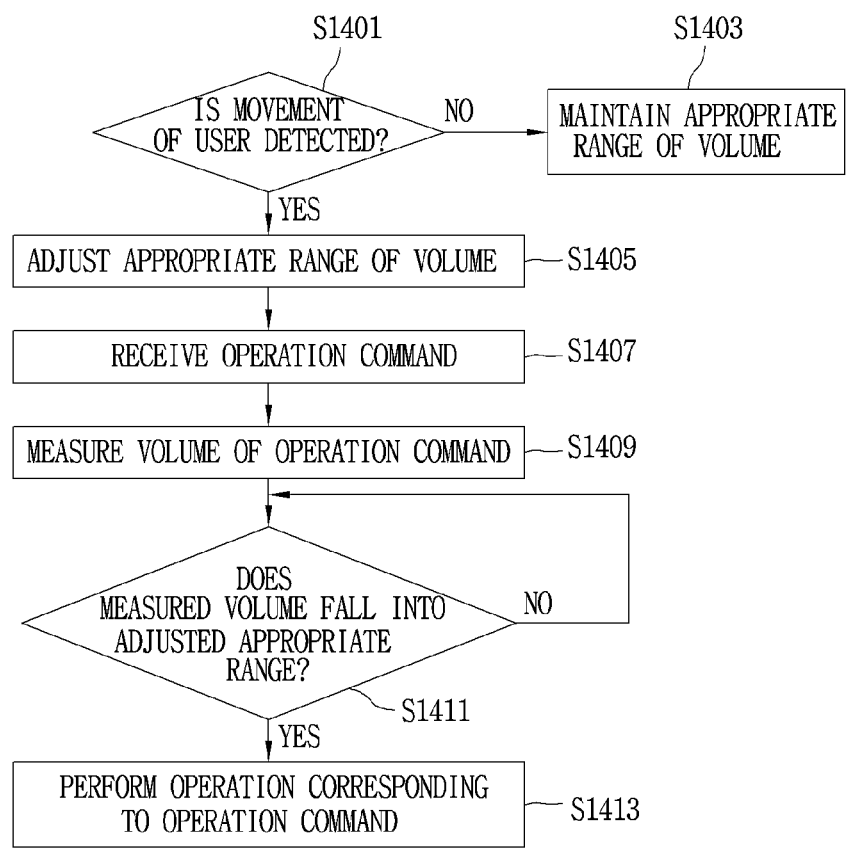
FIG. 14 is a flowchart for explaining a method of operating an artificial intelligence device according to another embodiment of the present disclosure.

FIG. 14 is a flowchart for explaining a method of operating an artificial intelligence device according to another embodiment of the present disclosure.

FIG. 14 may be a process that is performed in a state in which a device to be controlled is selected.

Referring to FIG. 14, the processor 180 of the artificial intelligence device 100 determines whether the movement of the user is detected (S1401).

For an example, the artificial intelligence device 100 may detect the movement of the user using one of an ultrasonic sensor, an infrared sensor or a laser sensor.

The ultrasonic sensor may emit a sound wave and repeatedly measure a time period required to receive the sound wave reflected from an object.

The infrared sensor may emit an infrared ray and repeatedly measure a time period required to receive the infrared ray reflected from an object.

The laser sensor may emit a laser beam and repeatedly measure a time period required to receive laser beam reflected from an object.

The processor 180 may acquire a distance between the user and the artificial intelligence device 100 using the measured time period. In addition, the processor 180 may acquire a change in distance according to a change in the measured time to determine whether the user is moving away from or closer to the artificial intelligence device 100.

When the movement of the user is not detected, the processor 180 maintains an appropriate range of the volume (S1403).

When the movement of the user is detected, the processor 180 of the artificial intelligence device 100 adjusts the appropriate range of the volume (S1405).

The processor 180 may adaptively adjust the appropriate range of the volume according to a distance between the user and the artificial intelligence device 100.

When the distance between the user and the artificial intelligence device 100 increases, the processor 180 may decrease the upper limit value and the lower limit value of the appropriate range.

On the contrary, when the distance between the user and the artificial intelligence device 100 decreases, the processor 180 may increase the upper limit value and the lower limit value of the appropriate range.

This will be described with reference to FIGS. 15 and 16.

Figure 15:
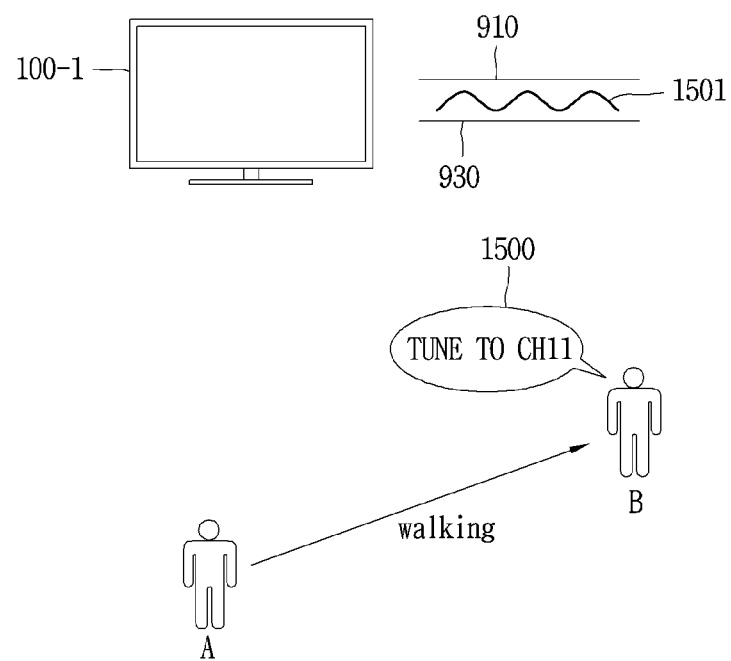
FIGS. 15 and 16 are diagrams explaining a process of automatically adjusting an appropriate range of a volume according to a user's movement detection.
Figure 16:
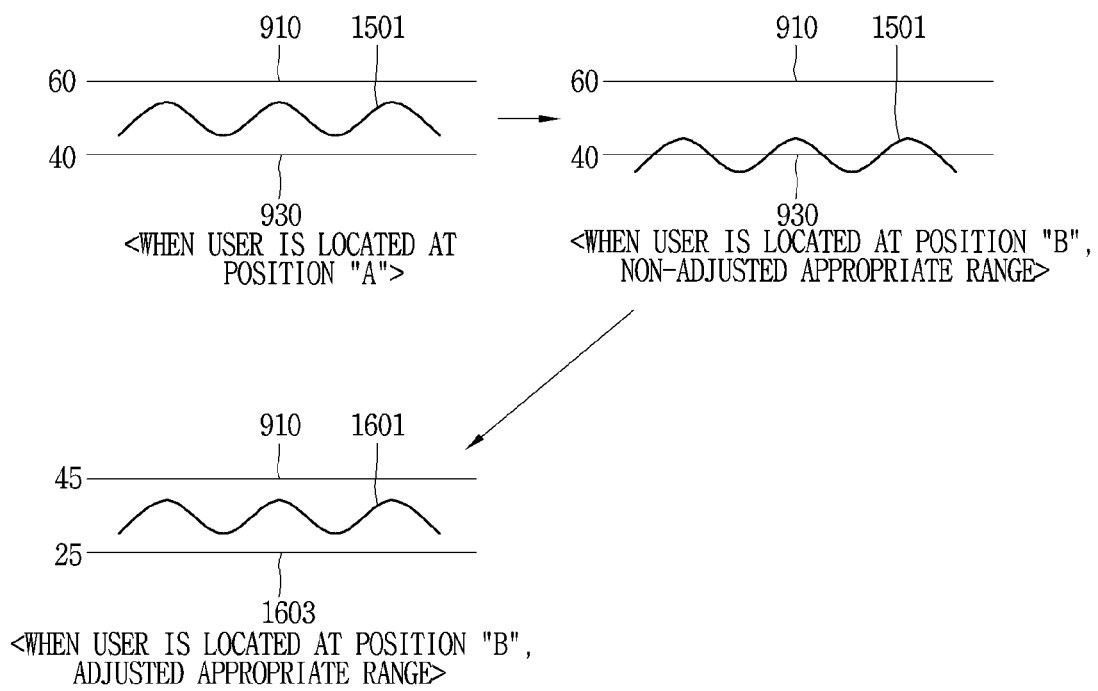

FIGS. 15 and 16 are diagrams explaining a process of automatically adjusting an appropriate range of a volume according to a user's movement detection.

Referring to FIG. 15, the appropriate range (the upper limit value: 910, the lower limit value: 930) of the volume of a speech received by the artificial intelligence device 100-1 when the user is located at a position A is shown.

That is, the artificial intelligence device 100-1 may determine whether the volume of the speech signal 1501 corresponding to the received operation command is within the appropriate range, in a case where the operation command is received when the user is located at the position A.

The artificial intelligence device 100-1 may perform an operation corresponding to the operation command when the volume of the speech signal 1501 is within the appropriate range.

The artificial intelligence device 100-1 may detect the movement of the user from the position A to the position B.

The artificial intelligence device 100-1 may measure a distance between the user who has moved to the position B and the artificial intelligence device 100-1.

The artificial intelligence device 100-1 may adjust the appropriate range of the volume using the measured distance.

Referring to FIG. 16, when the user is located at the position A, the speech signal 1501 corresponding to the operation command is within the appropriate range. It is assumed that the lower limit value of the appropriate range is 40 and the upper limit value of the appropriate range is 60.

When the operation command having the same volume is received in a state in which the user has moved from the position A to the position B, since a distance between the artificial intelligence device 100-1 and the user increases, the volume of the speech signal 1601 may not satisfy the appropriate range.

In this case, an operation with respect to the operation command of the user may not be performed, thereby causing inconvenience.

When the user has moved to the position B, the artificial intelligence device 100-1 may measure a distance between the user and the artificial intelligence device 100-1, and adjust the upper limit value and the lower limit value of the appropriate range using the measured distance.

For example, when the measured distance is farther than an existing distance, the artificial intelligence device 100-1 may change the upper limit value from 60 to 45, and change the lower limit value from 40 to 25.

Therefore, when the user utters the operation command 1500 at the position B, the speech signal 1601 of the operation command 1500 may be within the changed appropriate range.

The artificial intelligence device 100-1 may adjust the upper limit value and the lower limit value while maintaining a difference between the upper limit value and the lower limit value.

As described above, according to the embodiment of the present disclosure, even when the user moves, the appropriate range of the volume may be adjusted accordingly, thereby allowing the user to continuously control a desired device to be controlled.

The user may control the device to be controlled according to the existing uttered speech without adjusting the volume of an uttered speech according to his or her movement.

FIG. 14 will be described again.

The processor 180 receives an operation command through the microphone 122 (S1407), and measures a volume of the operation command (S1409).

The processor 180 determines whether the measured volume is within the adjusted appropriate range (S1411).

When the measured volume is within the appropriate range, the processor 180 performs an operation corresponding to the operation command (S1413).

Figure 17:
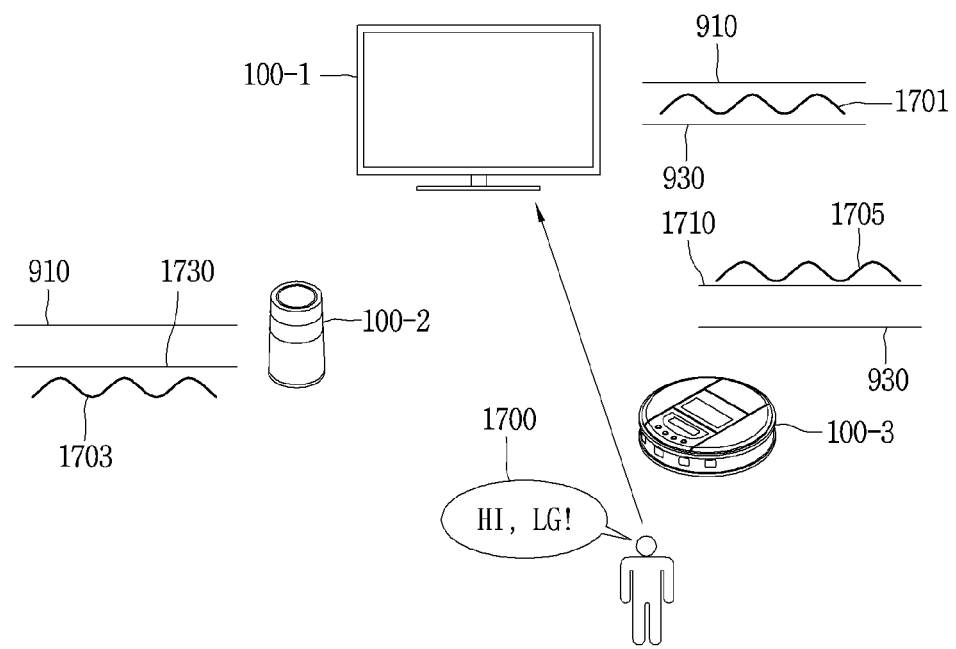
FIG. 17 is a diagram explaining a process of registering an appropriate utterance volume range of each device when a plurality of artificial intelligence devices are disposed at fixed locations according to an embodiment of the present disclosure.

FIG. 17 is a diagram explaining a process of registering an appropriate utterance volume range of each device when a plurality of artificial intelligence devices is disposed at fixed positions according to an embodiment of the present disclosure.

Referring to FIG. 17, each of the artificial intelligence device 100-1, the first external artificial intelligence device 100-2 and the second external artificial intelligence device 100-3 may be disposed at a fixed position in the home.

It is assumed that the distance between the user and the first external artificial intelligence device 100-2 is the largest and the distance between the user and the second external artificial intelligence device 100-3 is the smallest.

The user may register an appropriate utterance volume range of each device at a position where the device is fixed.

For example, it is assumed that the user registers the appropriate utterance volume range of the artificial intelligence device 100-1.

The user utters a wake-up command 1700 having a specific volume.

The processor 180 of the artificial intelligence device 100-1 may measure the volume of the received wake-up command 1700 and set an appropriate utterance volume range corresponding to the measured volume (S1701).

The appropriate utterance volume range may have an upper limit value 910 and a lower limit value 930.

For example, when the volume of the wake-up command 1700 is 50, the processor 180 may register a range of 40 to 60, which has an upper limit value 910 of 40 and a lower limit value 930 of 60, as the appropriate utterance volume range.

Meanwhile, the first external artificial intelligence device 100-2 may set the lower limit value 1730 of the appropriate utterance volume range to be lower than 40 (S1703).

On the contrary, the second external artificial intelligence device 100-3 may set the upper limit value 1710 to be lower than 60 (S1705).

When each of the processes S1701, S1703 and S1705 is repeatedly performed at a specific position or another position of the user, each artificial intelligence device may register an average value of upper limit values and an average value of lower limit values as the appropriate utterance volume range.

Figure 18:
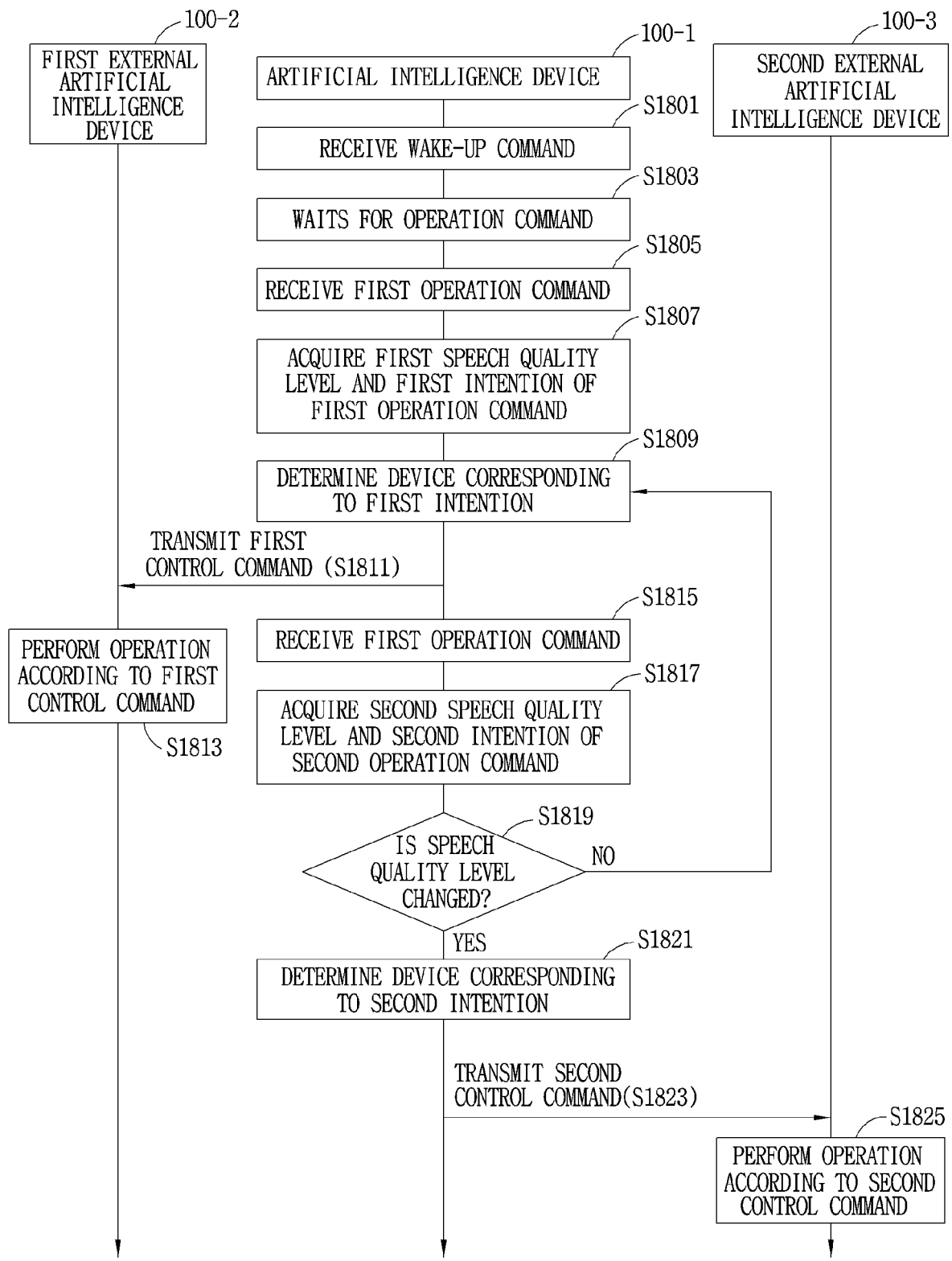
FIG. 18 is a ladder diagram for explaining a method of operating an artificial intelligence system according to still another embodiment of the present disclosure.

FIG. 18 is a ladder diagram for explaining a method of operating an artificial intelligence system according to still another embodiment of the present disclosure.

In particular, FIG. 18 relates to an embodiment of analyzing a user's utterance intention, and determining a device that will perform an operation corresponding to the user's speech command based on the analyzed speech intention.

Furthermore, in the following embodiment, the artificial intelligence device 100-1 may control the operations of the first external artificial intelligence device 100-2 and the second external artificial intelligence device 100-3, and may be a hub device capable of serving as a hub.

The hub device may be a device capable of receiving a user's speech command, acquiring an intention of the received speech command, and transmitting a control command that controls an operation of another external artificial intelligence device according to the acquired intention.

In one embodiment, the hub device may be a device previously designated by a user.

For another example, the hub device may be a device wirelessly connected to the largest number of artificial intelligence devices from among a plurality of artificial intelligence devices.

The hub device may have information on an artificial intelligence device connected to the hub device itself.

The information on the artificial intelligence device may include identification information capable of identifying the artificial intelligence device and operation state information indicating an operation state of the artificial intelligence device.

The microphone 122 of the artificial intelligence device 100-1 receives a wake-up command (S1801).

In one embodiment, the wake-up command may be a command for activating the operation of the artificial intelligence device 100-1.

The wake-up command may include a name of the artificial intelligence device 100-1 and a preset wake-up word.

The processor 180 of the artificial intelligence device 100-1 waits for the reception of an operation command according to the reception of the wake-up command (S1803).

The microphone 122 of the artificial intelligence device 100-1 receives a first operation command (S1805).

The user may utter the first operation command.

The processor 180 of the artificial intelligence device 100-1 acquires a first speech quality level indicating the quality of the received first operation command and an intention of the first operation command (S1807).

The processor 180 may acquire the first speech quality level from the speech data of the first operation command.

The speech quality level may be a power ratio of keyword speech to ambient noise (KSNAR).

In another example, the speech quality level may be a ratio of a keyword speech section to a signal of a noise section (SNR).

For another example, the speech quality level may be the voice volume of a speech command. The voice volume of the speech command may indicate a magnitude of a speech signal corresponding to the speech command.

The processor 180 may receive the intention of the first operation command from the NLP server 20 of FIG. 2.

The processor 180 may transmit the speech data of the first operation command to the NLP server 20, and receive the intention of the first operation command analyzed by the NLP server 20 from the NLP server 20.

For another example, when the processor 180 includes a natural language processing engine, the processor 180 may acquire the intention of the first operation command using the natural language processing engine.

The first operation command may be a command to perform a specific operation of the artificial intelligence device.

A process of acquiring the speech quality level borrows the description of FIGS. 5 and 6.

The processor 180 of the artificial intelligence device 100-1 determines a device corresponding to the acquired first intention (S1809).

In one embodiment, the processor 180 may determine an optimal device capable of performing the first intention from among the external artificial intelligence devices 100-2, 100-3.

The processor 180 may determine a device capable of performing the first intention based on the information of the plurality of external artificial intelligence devices 100-2, 100-3.

The information of the external artificial intelligence device may include at least one of identification information capable of identifying the external artificial intelligence device, a name, and a function of the external artificial intelligence device.

The processor 180 may determine a device that fits the first intention using the information of the plurality of external artificial intelligence devices 100-2, 100-3.

The processor 180 of the artificial intelligence device 100-1 transmits a first control command to the first external artificial intelligence device 100-2, which is the determined device, to perform an operation corresponding to the first intention through the short-range communication module 114 (S1811).

The processor 180 determines a device that fits the first intention between the first external artificial intelligence device 100-2 and the second external artificial intelligence device 100-3 as the first external artificial intelligence device 100-2.

Upon receiving the first control command, the first external artificial intelligence device 100-2 performs an operation corresponding to the first control command (S1813).

Meanwhile, the microphone 122 of the artificial intelligence device 100-1 receives a second operation command (S1815).

The second operation command may be a command consecutively uttered after the user utters the first operation command.

The second operation command may be a command received one second after receiving the first operation command, where one second is an example only.

The processor 180 of the artificial intelligence device 100-1 acquires a first speech quality level indicating the quality of the received second operation command and an intention of the second operation command (S1817).

The processor 180 may acquire a second speech quality level of the second operation command based on the speech data of the second operation command. A process of acquiring the speech quality level borrows the description of FIGS. 5 and 6.

In addition, the processor 180 may acquire the intention of the second operation command using the NLP server 20 or a natural language processing engine provided therein.

The processor 180 of the artificial intelligence device 100-1 compares the first speech quality level with the second speech quality level to determine whether the speech quality level has been changed (S1819).

The processor 180 may determine that the speech quality level has been changed when there is a difference between the first speech quality level and the second speech quality level by more than a preset level range.

Here, the preset level range may be a reference range for determining a change in the speech quality level.

For example, when the speech quality level is the voice volume, the processor 180 may determine that the speech quality level has been changed when a difference between a first voice volume of the first operation command and a second voice volume of the second operation command is above the preset voice volume range.

When a voice volume change occurs between the first operation command and the second operation command that has been received thereafter, the processor 180 may recognize it as an intention to change the device to be controlled.

When the speech quality level is changed, the processor 180 of the artificial intelligence device 100-1 determines a device corresponding to the second intention (S1821).

The processor 180 may determine a device capable of performing the second intention based on information on a plurality of artificial intelligence devices.

In the present embodiment, it will be described on the assumption that the second external artificial intelligence device 100-3 is determined as an optimal device capable of performing the second intention.

The processor 180 of the artificial intelligence device 100-1 transmits a second control command to the determined second external artificial intelligence device 100-3 to perform an operation that fits the first intention through the short-range communication module 114 (S1823).

Upon receiving the second control command, the second external artificial intelligence device 100-3 performs an operation corresponding to the second control command (S1825).

Figure 19:
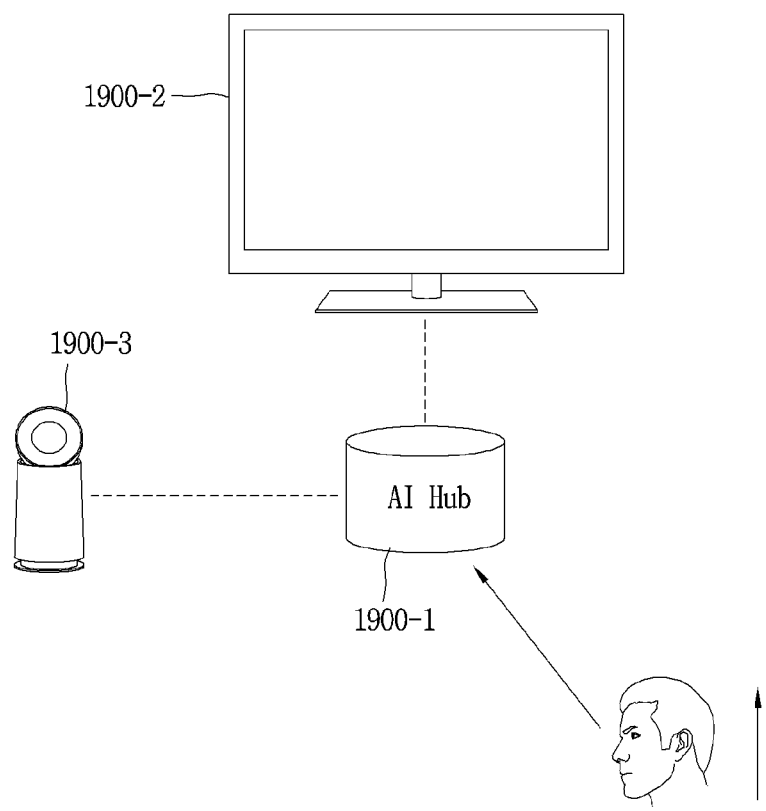
FIGS. 19 to 21 are diagrams explaining a process in which an AI hub device determines a device that will perform a speech command uttered by a user and transmits a control command to the determined device according to an embodiment of the present disclosure.
Figure 20:
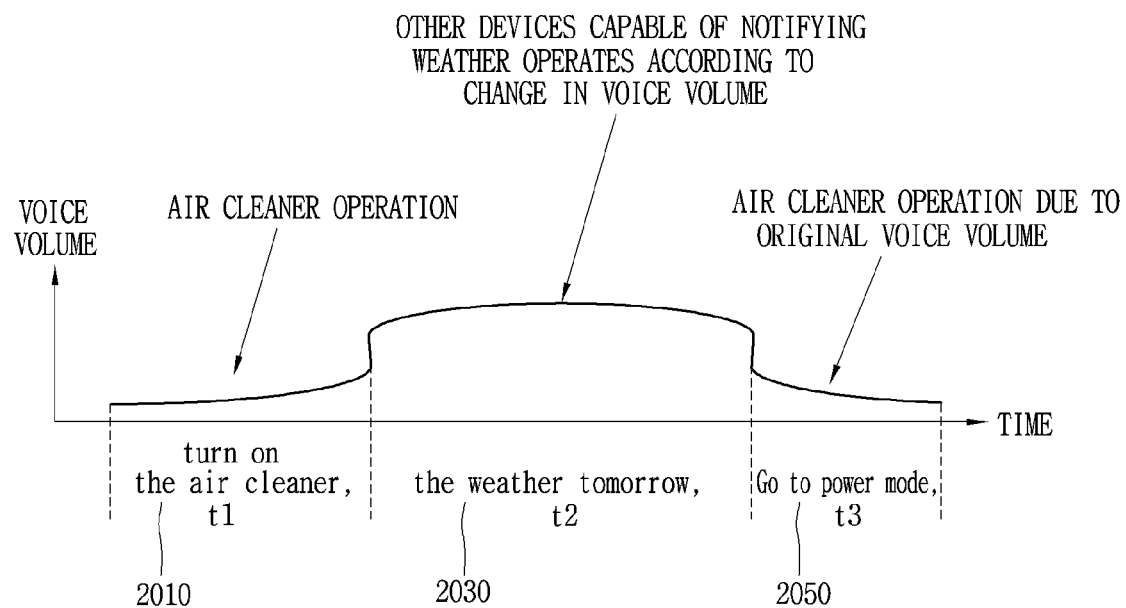
Figures 21, 22:
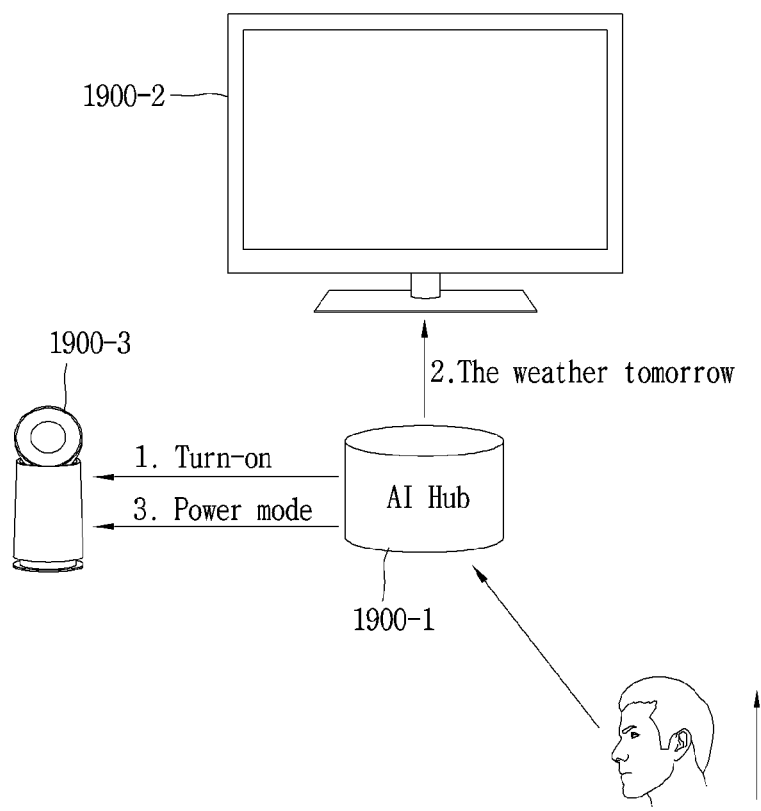
FIG. 22 illustrates an example of determining a device that will perform an operation command from among a plurality of artificial intelligence devices, when there exist a plurality of devices that will perform an operation command uttered by a user, according to an embodiment of the present disclosure.

FIGS. 19 to 21 are diagrams explaining a process in which an AI hub device determines a device that will perform a speech command uttered by a user and transmits a control command to the determined device according to an embodiment of the present disclosure.

In FIGS. 19 to 21, it is assumed that an AI hub device 1900-1 is the artificial intelligence device 100-1 of FIG. 18, a TV 1900-2 is the first external artificial intelligence device 100-2, and an air purifier 1900-3 is the second external artificial intelligence device 100-3.

In addition, it is assumed in FIGS. 19 to 21 that the speech quality level is the voice volume of an operation command.

The AI hub device 1900-1 may perform wireless communication with the TV 1900-2 and the air purifier 1900-3.

The AI hub device 1900-1 may receive information on identification information of the TV 1900-2, a name, a model name of the TV 1900-2, and functions that can be performed by the TV 1900-2 from the TV 1900-2.

Similarly, the AI hub device 1900-1 may receive identification information of the air purifier 1900-3, a name, a model name, and functions that the air purifier 1900-3 can be perform by the air purifier 1900-3.

Referring to FIG. 20, it is a graph showing a change in the voice volume of a speech command uttered by a user according to time.

First, the user sequentially utters a first operation command 2010 having a first time section t1, utters a second operation command 2030 having a second time section t2, and a third operation command 2050 having a third time interval t3.

The AI hub device 1900-1 may receive the first operation command 2010, and acquire the first voice volume and the first intention of the received first operation command 2010.

The AI hub device 1900-1 may acquire the first intention of the first operation command 2010 using speech data corresponding to the first operation command 2010.

The AI hub device 1900-1 may understand the intention of <turn on air cleaner> as turning on the power of the air cleaner 1900-3.

The AI hub device 1900-1 may retrieve the air purifier 1900-3 using the information of a device connected to the AI hub device 1900-1 itself, and transmit a control command for turning on the power to the retrieved air purifier 1900-3 as shown in FIG. 21.

The air purifier 1900-3 may turn on its own power according to a control command received from the AI hub device 1900-1.

Then, the AI hub device 1900-1 may receive the second operation command 2030, and acquire the second voice volume and the second intention of the second operation command 2030.

The AI hub device 1900-1 may compare the first voice volume with the second voice volume, and determine whether a difference between the first voice volume and the second voice volume is above a preset voice volume range as a result of the comparison.

For example, it is assumed that the first voice volume is 20, the second voice volume is 50, and the preset voice volume range is 10 to 20. Here, the preset voice volume range is merely an example, and the reference value may be a preset fixed value.

Since 30, which is a difference between the first voice volume and the second voice volume, does not fall within the preset voice volume range, the AI hub device 1900-1 may recognize the reception of the second operation command 2030 as a trigger that changes the device to be controlled.

The AI hub device 1900-1 may recognize the intention to change the device to be controlled and acquire the intention of <tell me tomorrow weather>, which is the second operation command 2030.

The AI hub device 1900-1 may acquire the user's intention for tomorrow weather.

The AI hub device 1900-1 may retrieve a remaining device other than the air purifier 1900-3 that has performed an operation corresponding to the first intention of the first operation command, and determine whether the TV 1900-2, which is the remaining device, is a device capable of performing the second intention.

When it is determined that the TV 1900-2 is a device capable of performing the second intention based on the functions of the TV 1900-2 stored in advance, the AI hub device 1900-1 may determine the TV 1900-2 as a device that will perform the second intention.

As shown in FIG. 21, the AI hub device 1900-1 may transmit a control command that outputs tomorrow weather corresponding to the second intention to the TV 1900-2.

The TV 1900-2 may output tomorrow weather according to a control command received from the AI hub device 1900-1.

As described above, according to an embodiment of the present disclosure, the voice volume and intention of the user's speech command may be recognized to clearly select a device that will perform an operation corresponding to the speech command.

Accordingly, the user may obtain a desired result by simply uttering a speech command that changes the volume of an utterance.

Furthermore, the user may accurately obtain a desired result by uttering only a command to perform his or her desired operation without uttering the name of a device, thereby feeling an improved user experience.

Meanwhile, referring back to FIG. 20, the AI hub device 1900-1 may receive the third operation command 2030, and acquire the third performance and third intention of the third operation command 2050.

The AI hub device 1900-1 may compare the second voice volume with the third voice volume, and determine whether a difference between the second voice volume and the third voice volume is above a preset voice volume range as a result of the comparison.

For example, when the second voice volume is 50 and the third voice volume is 20, the difference is 30, and does not fall within the preset range.

Since a difference between the second voice volume and the third voice volume does not fall within the preset voice volume range, the AI hub device 1900-1 may recognize the reception of the third operation command 2050 as a trigger that changes a device to be controlled.

In one embodiment, when the third voice volume is the same as the first voice volume, the AI hub device 1900-1 may recognize a device to be controlled as a trigger that changes an existing device to be controlled.

In another example, when a difference between the third voice volume and the first volume falls within a preset volume range, the AI hub device 1900-1 may recognize a device to be controlled as a trigger that changes an existing device to be controlled.

The AI hub device 1900-1 may recognize the intention to change the device to be controlled and acquire the intention of <go to power mode>, which is the third operation command 2050.

That is, the AI hub device 1900-1 may acquire the user's intention to change the mode to a power mode.

The AI hub device 1900-1 may retrieve a device having a power mode and determine the retrieved air purifier 2010 as a device to be controlled.

The AI hub device 1900-1 may determine the air purifier 1900-3 having a power mode function as a device capable of performing the third intention, and transmit a control command requesting to switch to the power mode to the air purifier 1900-3 as shown in FIG. 21.

Accordingly, the air purifier 1900-3 may switch the operation mode to the power mode.

Next, FIG. 22 will be described.

FIG. 22 illustrates an example of determining a device that will perform an operation command from among a plurality of artificial intelligence devices, when there exist a plurality of devices that will perform an operation command uttered by a user, according to an embodiment of the present disclosure.

In FIG. 22, it is assumed that the operation command is <turn on the light>.

The AI hub device may confirm that the first and second external artificial intelligence devices can perform the relevant operation command in the process of retrieving a device that will perform an intention corresponding to the operation command.

In this case, the AI hub device may determine a device that will perform an intention corresponding to the operation command, from among the first and second external artificial intelligence devices, based on a distance away from the AI hub device itself.

For example, when a distance between the AI hub device and the first external artificial intelligence device is 3 m, and a distance between the AI hub device and the second external artificial intelligence device is 5 m, the AI hub device may determine the first external artificial intelligence device as device that will perform the intention of the operation command.

That is, the AI hub device may determine the first external artificial intelligence device as a first priority and the second external artificial intelligence device as a second priority.

This is because the closer a distance between the AI hub device and the external artificial intelligence device, the faster a control signal transmitted to the external artificial intelligence device by the external artificial intelligence device can be delivered.

When the control signal is transmitted faster, an operation result corresponding to the user's operation command may be provided to the user more quickly.

When the power of the first external artificial intelligence device is turned off, the AI hub device may determine the second external artificial intelligence device as the device to be controlled regardless of the distance.

That is, the AI hub device may transmit a control signal the fits the user's intention to the second external artificial intelligence device.

Meanwhile, the present disclosure can control a plurality of artificial intelligence devices in various ways.

Hereinafter, a method of controlling a plurality of artificial intelligence devices will be described with reference to the accompanying drawings.

Figure 23:
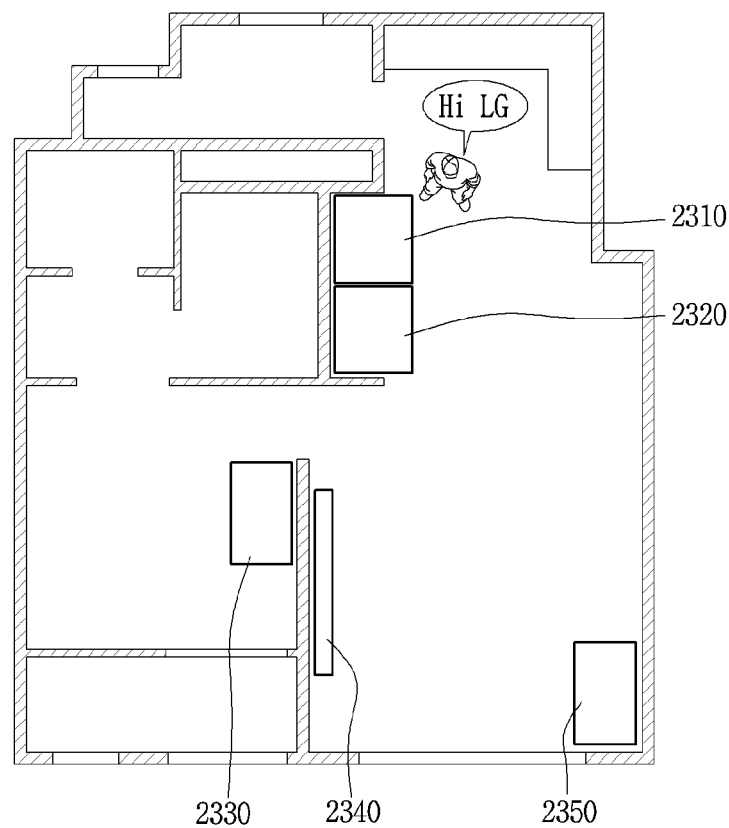
FIG. 23 is a conceptual diagram for explaining a method of controlling an artificial intelligence device according to another embodiment of the present disclosure.
Figure 24:
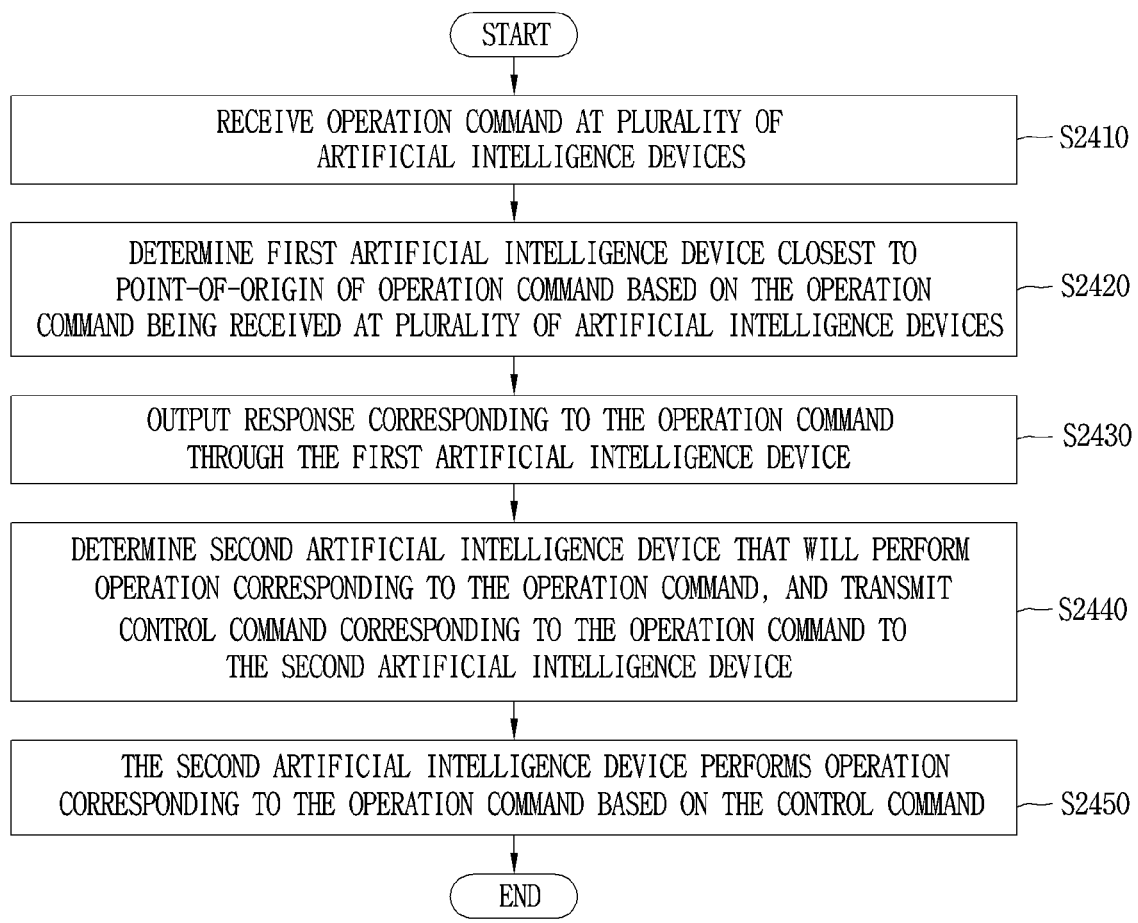
FIG. 24 is a flowchart for explaining a method of controlling an artificial intelligence device according to another embodiment of the disclosure.
Figure 25:
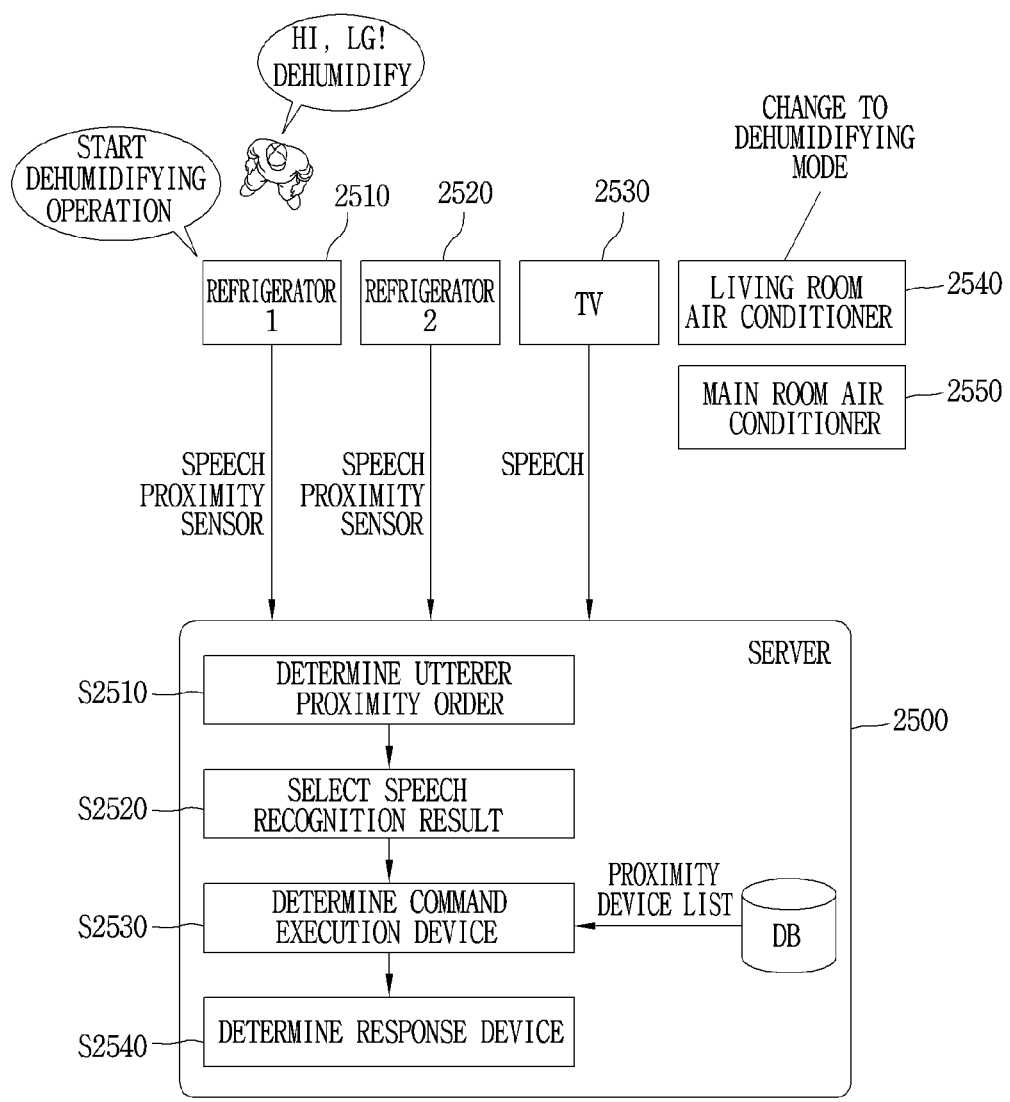
FIGS. 25, 26 and 27 are conceptual diagrams for explaining the control method illustrated in FIG. 24.
Figure 26:
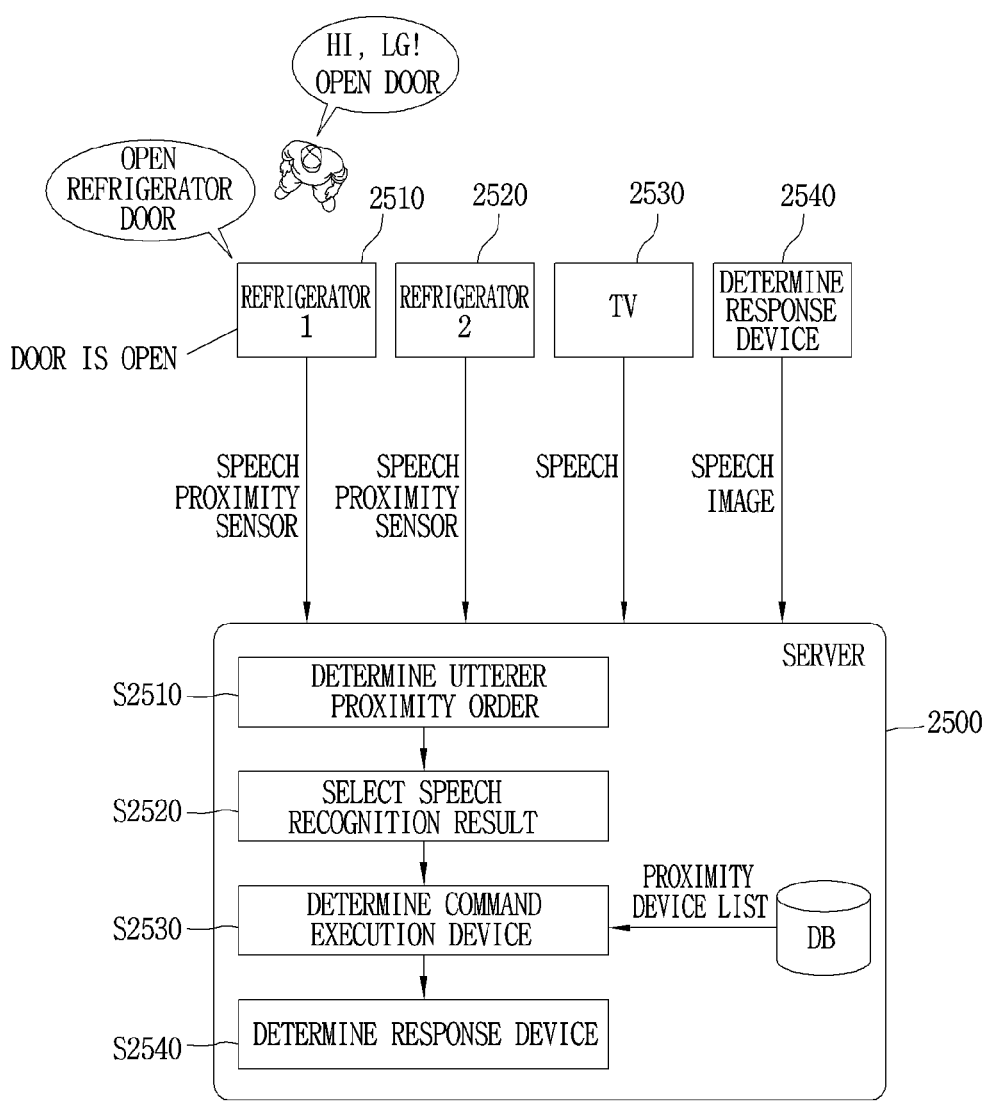
Figure 27:
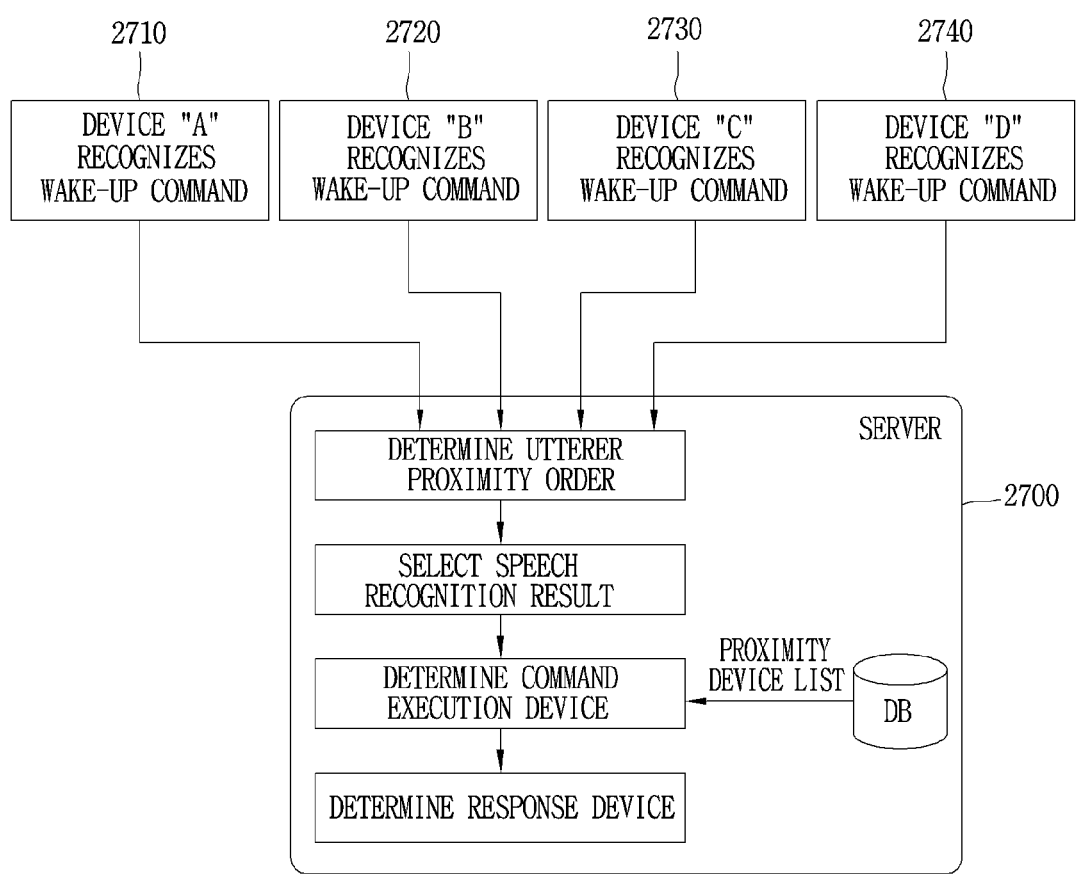

FIG. 23 is a conceptual diagram for explaining a method of controlling an artificial intelligence device according to another embodiment of the present disclosure, FIG. 24 is a flowchart for explaining a method of controlling an artificial intelligence device according to another embodiment of the disclosure, and FIGS. 25, 26 and 27 are conceptual diagrams for explaining the control method illustrated in FIG. 24.

Referring to FIG. 23, in the present disclosure, when an utterer utters an operation command in a state in which a plurality of artificial intelligence devices 2310, 2320, 2330, 2340, 2350 are present, at least one of the plurality of artificial intelligence devices may be controlled in an optimized method.

For example, the present disclosure may provide a method of selecting an artificial intelligence device to be operated using an utterer proximity priority speech, a speech recognition result and an intention analysis result, and controlling a non-wake-up device.

For an example, in the artificial intelligence device of the present disclosure, when a plurality of devices capable of performing the same command are present, a device closest to the user may perform the command first.

In addition, in the artificial intelligence device of the present disclosure, at this time, the most optimal device may perform and respond to a command according to the accuracy of a speech recognition result, whether it is possible to perform an intention analysis result including non-wake-up devices, and a user proximity priority.

A representative control method of a plurality of artificial intelligence devices of the present disclosure will be described with reference to FIG. 24.

In the present disclosure, a step of receiving an operation command at a plurality of artificial intelligence devices is carried out (S2410).

As shown in FIG. 25, the plurality of artificial intelligence devices 2510, 2520, 2530, 2540, 2550 may include various types of devices, and may include various types of devices, for an example, a refrigerator, a TV, an air conditioner, a computer, a mobile terminal, etc.

Furthermore, the plurality of artificial intelligence devices may include different types of devices or may include the same types of devices.

In the present disclosure, a step of determining a first artificial intelligence device closest to a point-of-origin of an operation command based on the operation command being received at a plurality of artificial intelligence devices is carried out (S2420).

For an example, when determining a first artificial intelligence device, upon receiving an operation command at the plurality of artificial intelligence devices, the processor 180 may determine the first artificial intelligence device closest to the point-of-origin of the operation command based on a volume level of the received operation command.

The volume level of the operation command may denote a speech level (or sound level) of the received operation command.

The plurality of artificial intelligence devices that have received the operation command may mutually share the volume level of the operation command, and determine an artificial intelligence device recognized with the largest volume level from among them as the first artificial intelligence device closest to the point-of-origin of the operation command.

For another example, each of the plurality of artificial intelligence devices may further include a sensor capable of sensing a distance to the point-of-origin of the operation command.

Such a sensor may include various sensors included in the sensing unit 140 described with reference to FIG. 1.

When determining a first artificial intelligence device, the processor 180 may determine the first artificial intelligence device closest to the point-of-origin of the operation command based on the sensor.

That is, when an operation command is received in a state in which a plurality of artificial intelligence devices are present, the artificial intelligence device of the present disclosure may determine an artificial intelligence device closest thereto as the first artificial intelligence device.

Then, in the present disclosure, a step of outputting a response (or answer) corresponding to the operation command through the first artificial intelligence device is carried out (S2430).

The first artificial intelligence device, which is an artificial intelligence device closest to a point-of-origin of the operation command, that is, an utterer, may serve to communicate with the utterer.

That is, in the present disclosure, even when an operation corresponding to the operation command is an operation for a second artificial intelligence device rather than the first artificial intelligence device, a response corresponding to the operation command may be output through the first artificial intelligence device.

Meanwhile, in the present disclosure, a step of determining a second artificial intelligence device that will perform an operation corresponding to the operation command, and transmitting a control command corresponding to the operation command to the second artificial intelligence device is carried out (S2440).

The processor 180 may determine whether an artificial intelligence device capable of an operation corresponding to the operation command is present by the first artificial intelligence device closest to the point-of-origin of the operation command.

The processor 180 may determine an artificial intelligence device capable of an operation corresponding to the operation command as the second artificial intelligence device.

The processor 180 may transmit a control command corresponding to the operation command from the first artificial intelligence device to the second artificial intelligence device.

Meanwhile, when an operation command is received at a plurality of artificial intelligence devices, the plurality of artificial intelligence devices may respectively determine an artificial intelligence device that will perform an operation corresponding to the operation command.

In the present disclosure, when artificial intelligence devices that will perform an operation corresponding to the operation command determined by the plurality of artificial intelligence devices are different from one another, the second artificial intelligence device may be determined based on a preset algorithm.

Here, the preset algorithm may determine the second artificial intelligence device based on at least one of a majority vote and a result determined by the nearest artificial intelligence device.

That is, in the present disclosure, when the artificial intelligence devices that will perform an operation corresponding to the operation command determined by respective artificial intelligence devices are different from one another, an artificial intelligence device to finally perform the operation corresponding to the operation command may be determined through a majority vote or an artificial intelligence device determined by the first artificial intelligence device closest to the utterer may be determined as the artificial intelligence device that will perform the operation corresponding to the operation command.

To this end, the plurality of artificial intelligence devices may mutually share the results of the artificial intelligence devices that respectively perform an operation corresponding to the operation command.

Meanwhile, when a plurality of artificial intelligence devices are present, there may be a plurality of second artificial intelligence devices capable of performing an operation corresponding to the operation command.

For example, an artificial intelligence device capable of performing an operation corresponding to an operation command may be an air conditioner, and there may be a plurality of air conditioners.

That is, the processor 180 may determine whether there are a plurality of second artificial intelligence devices capable of performing an operation corresponding to the operation command.

When there are the plurality of second artificial intelligence devices, the processor 180 may select any one of the second artificial intelligence devices through at least one of a distance to a point-of-origin of the operation command, an execution history of the relevant operation command, a priority, and the reception of an additional command.

Then, in the present disclosure, a step of performing, by the second artificial intelligence device, an operation corresponding to the operation command based on the control command is carried out (S2450).

At this time, when it is determined that the present artificial intelligence device is the second artificial intelligence device that performs an operation corresponding to the operation command, the processor 180, upon receiving a control command, may output a notification sound to notify the utterer of whether the control command has been received.

Through this, in the present disclosure, the utterer may accurately recognize which device is an operating device that performs the operation command.

The foregoing description will be more clearly understood with reference to the following example.

Referring to FIG. 25, for an example, the utterer may utter an operation command (or a wake-up word) in a state in closest proximity to any one of a plurality of artificial intelligence devices (e.g., refrigerator 1) 2510.

Here, the operation command may be an operation command for operating an artificial intelligence device (e.g., living room air conditioner) 2540 other than the nearest device 2510.

In this case, the plurality of artificial intelligence devices may receive the operation command, and determine an utterer proximity order (S2510).

For example, it is determined that the refrigerator 1 is the nearest device using a speech of the operation command acquired by the plurality of artificial intelligence devices, proximity sensor data, and the like.

Then, in the present disclosure, a step of selecting a speech recognition result may be carried out (S2520).

For example, when the speech recognition results for the operation command are the same in the three devices 2510, 2520, 2530, the plurality of artificial intelligence devices may determine that the operation command is executable.

Then, in the present disclosure, a step of determining a command execution device may be performed (S2530).

For example, the processor 180 may check whether a device capable of performing an operation corresponding to the operation command is present in a proximity device list including both devices that have recognized the operation command and devices that have not recognized the operation command.

If a plurality of executable devices (e.g., a living room air conditioner 2540 and a main room air conditioner 2550) are present, the processor 180 may determine a device (e.g., the living room air conditioner 2540) closest to the nearest device 2510 as a command execution device, and transmit a control command for the operation command thereto.

Furthermore, in the present disclosure, a step of determining a response device is carried out (S2540), and the response device may be a device closest to the utterer.

The device that has received the control command may perform an operation corresponding to the operation command, and output a notification sound, and the device closest to the utterer may output information indicating that the command execution device has performed the operation.

Such an operation may be performed by at least one of a plurality of artificial intelligence devices, or may be performed by a separate server 2500.

The server may include at least one of the elements described with reference to FIG. 1.

Referring to FIG. 26, in the present disclosure, a plurality of artificial intelligence devices may receive an operation command.

Here, when speech recognition results recognized by the plurality of artificial intelligence devices are different (e.g., when the speech recognition result of the air conditioner 2540 is different from the speech recognition results of the remaining devices 2510, 2520, 2530), an operation corresponding to the operation command and a device performing the operation may be determined based on at least one of a majority vote, a nearest device and a credential score.

As shown in FIG. 27, when an operation command is received at a plurality of artificial intelligence devices from among a plurality of artificial intelligence devices 2710, 2720, 2730, 2740, a server 2700 may receive information corresponding to the recognized operation command from the plurality of artificial intelligence devices, and perform an operation such as an utterer proximity order determination, a speech recognition result selection, a command execution device determination, and a response device determination as described above.

The utterer proximity order determination will be described in more detail.

In the present disclosure, the utterer proximity order may be determined by (1) comparing the characteristics of speech signals acquired from respective devices, (2) considering the utterer's location, utterance direction and the like through an image analysis, or (3) using a proximity sensor signal.

In the case of a device that cannot receive a speech/video/proximity signal that is necessary for determining the proximity order, the processor 180 may arrange the proximity order as a lower priority.

(1) Speech Processing Method for Determining Utterer Proximity Order

The artificial intelligence device of the present disclosure may perform the synchronization of signals acquired from respective devices for accurate comparison of wake-up word signals, and analyze features thereof, and then compare the features at the respective devices to determine a proximity order.

The features may include a root mean square, a keyword speech to ambient noise ratio, a priori SNR, a brightness, and a centroid, formant energy, low-frequency component energy, linear prediction residual, linear prediction residual kurtosis, and the like of speech data.

The processor 180 may perform calibration between the features when the magnitudes of input speech signals are different due to different microphones, ADCs, heights of the microphones, depth of microphone holes, and the like, for respective devices.

(2) Image Processing Method for Determining Utterer Proximity Order

When a wake-up word is recognized, the processor 180 may perform the synchronization of images at wake-up word recognition time points acquired by respective devices.

For example, the processor 180 may find a space configuration, a location of another home appliance, and a human face from image data using an object recognition method.

When several people are present in a space in which the wake-up word is recognized, the processor 180 may estimate a change in mouth shape to find the utterer and estimate the utterer's location and face direction in the space.

In a case where the utterer looks at a distant device other than a nearby device, the processor 180 may estimate a distance from a device in proximity to an utterance direction device to the utterer to perform calibration of a ratio of the utterance direction to the utterer's location so as to select the device in proximity when the distance is farther than a predetermined multiple.

(3) Proximity Sensor Processing Method for Utterer Proximity Order

In the case of a proximity sensor in the present disclosure, it may be determined that there is a nearby object according to the installation environment, an average value and a standard deviation may be stored in a server for a case where it is determined by the server that there is no object in proximity.

When a distance to the object acquired by the proximity sensor is closer than the standard deviation based on the average value, the processor 180 may determine it as meaningful data.

Since a person other than the utterer may approach a device including the proximity sensor, the processor 180 may determine it together with speech and image data.

The selection of a speech recognition result will be described in more detail.

In the present disclosure, when a speech is polluted by noise or the intelligibility of the speech is reduced by a direction of the utterer's utterance while multiple devices are woken up to attempt speech recognition at the same time, the accuracy of speech recognition may be reduced, and it may be necessary to select a representative result to check whether to operate a device that is not woken up.

Accordingly, in the present disclosure, a majority vote result from among speech recognition results may be selected as a representative result.

Furthermore, the present disclosure may select the most certain result as a representative result based on a speech recognition confidence score.

The processor 180 may select, as a representative result, a result of a device capable of determining that the utterer's speech is best acquired based on a distance to the utterer and an utterance direction thereof.

The processor 180 may check whether the representative result can be analyzed for an intention to make a final decision, and in this case, it may be reflected in the command execution device determination when a device capable of performing the intention can be specified.

When all the speech recognition results cannot be analyzed for the intention, the processor 180 may determine a response device without determining a command execution device to respond that the command cannot be performed.

The determination of a command execution device will be described as follows.

The command execution device refers to a device to execute a user's command.

In the present disclosure, since there may be a case where the command execution device is not woken up, the DB may retrieve a list of nearby home appliances (registered in advance with information on devices that are present in the same space) to check whether the command can be performed for all devices in the same space.

When it is a command for a specific device in the selection of a speech recognition result (when the command includes information capable of specifying a single device, such as a device name, a device alias name, and spatial information), the processor 180 may determine the specified device as a command execution device.

When it is not a command for a specific device (device and space-related information is not uttered, or a device name is uttered, but there are multiple devices, etc.), the processor 180 may check whether there is a device capable of executing the command to determine it as a command executing device when there is an executable device.

When there are a plurality of command executable devices, the processor 180 may preferentially operate the specified device, (1) which is close to the utterer, (2) which is located in an adjacent space, (3) which is mainly used by the utterer, (4) which has a high command execution priority, or (5) through a conversation.

The command execution priority may be selected by the user through a mobile phone app or may be determined by the server as a policy.

The response device determination will be described as follows.

The response device refers to a device that notifies the user of an execution result.

In the present disclosure, a device having a high utterer proximity order from among devices that are woken up may be determined as a response device.

When the utterer proximity order is unclear, a device having the highest command execution priority from among devices that are woken up may respond.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. The computer may also include the processor 180 of the artificial intelligence device.

What is claimed is:

1. A method of controlling a plurality of artificial intelligence devices, the method comprising:
   receiving an operation command at the plurality of artificial intelligence devices;
   based on the operation command being received at the plurality of artificial intelligence devices, identifying a first artificial intelligence device of the plurality of artificial intelligence devices as being closest to a point-of-origin of the operation command;
   outputting a response corresponding to the operation command through the first artificial intelligence device;
   identifying a second artificial intelligence device of the plurality of artificial intelligence devices that will perform an operation corresponding to the operation command;
   transmitting a control command corresponding to the operation command to the second artificial intelligence device; and
   performing, by the second artificial intelligence device, the operation corresponding to the operation command based on the control command,
   wherein outputting the response corresponding to the operation command through the first artificial intelligence device comprises outputting the response corresponding to the operation command even when the operation corresponding to the operation command is an operation for the second artificial intelligence device that is different from the first artificial intelligence device,
   wherein:
   the first artificial intelligence device is closest to a speaker who uttered the operation command, detects the operation command with a loudest volume, and outputs information to the speaker notifying that the second artificial intelligence device has performed an operation when the second artificial intelligence device performs the operation corresponding to the operation command; and
   the second artificial intelligence device performs the operation according to the operation command transmitted from the first artificial intelligence device, and detects the operation command with a lower volume than the first artificial intelligence device as it is further away from the speaker than a distance between the speaker and the first artificial intelligence device.

2. The method of claim 1, wherein each of the plurality of artificial intelligence devices comprises a sensor configured to sense a distance to the point-of-origin of the operation command, and
wherein identifying the first artificial intelligence device comprises identifying the first artificial intelligence device as being closest to the point-of-origin of the operation command based on the sensor of the first artificial intelligence device.

3. The method of claim 1, wherein identifying the second artificial intelligence device comprises:
determining, by the first artificial intelligence device closest to the point-of-origin of the operation command, whether an artificial intelligence device capable of performing the operation corresponding to the operation command is present; and
identifying the second artificial intelligence device as being capable of performing the operation corresponding to the operation command, and
wherein transmitting the control command comprises transmitting, by the first artificial intelligence device, the control command to the second artificial intelligence device.

4. The method of claim 1, wherein identifying the second artificial intelligence device comprises:
identifying, by the plurality of artificial intelligence devices, respectively, artificial intelligence devices that will perform the operation corresponding to the operation command; and
identifying the second artificial intelligence device based on a preset algorithm in response to the artificial intelligence devices identified by the plurality of artificial intelligence devices being different from one another.

5. The method of claim 4, wherein the preset algorithm identifies the second artificial intelligence device based on at least one of a majority vote or a result determined by the first artificial intelligence device closest to the point-of-origin of the operation command.

6. The method of claim 1, wherein identifying the second artificial intelligence device comprises:
determining whether a plurality of second artificial intelligence devices capable of performing the operation corresponding to the operation command are present; and
based on the plurality of second artificial intelligence devices being present, selecting the second artificial intelligence device from among the plurality of second artificial intelligence devices based on at least one of a distance to the point-of-origin of the operation command, an execution history of the operation command, a priority, or a reception of an additional command.

7. The method of claim 1, wherein performing, by the second artificial intelligence device, the operation corresponding to the operation command comprises outputting a notification sound to notify an utterer that the control command has been received when the second artificial intelligence device receives the control command.

8. An artificial intelligence device comprising:
a microphone configured to receive an operation command uttered by a user;
a transceiver configured to communicate with another artificial intelligence device;
an audio output device configured to output a response corresponding to the operation command; and
a processor configured to:
identify a first artificial intelligence device of a plurality of artificial intelligence devices as being closest to a point-of-origin of the operation command based on the operation command being received at the plurality of artificial intelligence devices; and
based on the artificial intelligence device being the first artificial intelligence device:
output the response corresponding to the operation command through the first artificial intelligence device;
identify a second artificial intelligence device of the plurality of artificial intelligence devices that will perform an operation corresponding to the operation command; and
transmit a control command corresponding to the operation command to the second artificial intelligence device,
wherein even when the operation corresponding to the operation command is an operation for the second artificial intelligence device rather than the first artificial intelligence device, the response corresponding to the operation command is output through the first artificial intelligence device,
wherein:
the first artificial intelligence device is closest to a speaker who uttered the operation command, detects the operation command with a loudest volume, and outputs information to the speaker notifying that the second artificial intelligence device has performed an operation when the second artificial intelligence device performs the operation corresponding to the operation command; and
the second artificial intelligence device performs the operation according to the operation command transmitted from the first artificial intelligence device, and detects the operation command with a lower volume than the first artificial intelligence device as it is further away from the speaker than a distance between the speaker and the first artificial intelligence device.

9. The artificial intelligence device of claim 8, wherein based on the artificial intelligence device being the second artificial intelligence device, the processor is further configured to perform the operation corresponding to the operation command based on the control command.

10. The artificial intelligence device of claim 8, further comprising:
a sensor configured to sense a distance to the point-of-origin of the operation command,
wherein the processor is further configured to identify the first artificial intelligence device as being closest to the point-of-origin of the operation command based on the sensor.

11. The artificial intelligence device of claim 8, wherein, based on the artificial intelligence device being the first artificial intelligence device, the processor is further configured to identify the second artificial intelligence device by:
determining whether an artificial intelligence device capable of performing the operation corresponding to the operation command is present; and
identifying the second artificial intelligence device as being capable of performing the operation corresponding to the operation command.

12. The artificial intelligence device of claim 8, wherein, based on the operation command being received at the plurality of artificial intelligence devices, the artificial intelligence device is one of the plurality of artificial intelligence devices that, respectively, identify artificial intelligence devices that will perform the operation corresponding to the operation command, and the processor is further configured to identify the second artificial intelligence device based on a preset algorithm in response to the artificial intelligence devices identified by the plurality of artificial intelligence devices being different from one another.

13. The artificial intelligence device of claim 12, wherein the preset algorithm identifies the second artificial intelligence device based on at least one of a majority vote or a result determined by the first artificial intelligence device closest to the point-of-origin of the operation command.

14. The artificial intelligence device of claim 8, wherein, based on the artificial intelligence device being the first artificial intelligence device, the processor is further configured to identify the second artificial intelligence device by:
   determining whether a plurality of second artificial intelligence devices capable of performing the operation corresponding to the operation command are present; and
   based on the plurality of second artificial intelligence devices being present, selecting the second artificial intelligence device from among the plurality of second artificial intelligence devices based on at least one of a distance to the point-of-origin of the operation command, an execution history of the operation command, a priority, or a reception of an additional command.

15. The artificial intelligence device of claim 8, wherein based on the artificial intelligence device being the second artificial intelligence device, the processor is further configured to, upon receiving the control command, output a notification sound to notify the user that the control command has been received.

16. The method of claim 1, wherein:
   the first artificial intelligence device receives and recognizes the operation command spoken by the speaker and selects the second artificial intelligence device from among a plurality of devices based on an intention analysis result according to the recognition result, and
   the second artificial intelligence device does not recognize the operation command spoken by the speaker.

\* \* \* \* \*